United States Patent
Feng et al.

(10) Patent No.: US 12,168,994 B2
(45) Date of Patent: Dec. 17, 2024

(54) ROTATING MECHANISM, SUPPORT APPARATUS, AND TERMINAL WITH FOLDABLE SCREEN

(71) Applicant: HONOR DEVICE CO., LTD., Guangdong (CN)

(72) Inventors: Lei Feng, Shenzhen (CN); Yameng Wei, Shenzhen (CN); Wei Zhang, Shenzhen (CN); Wenxing Yao, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/916,607

(22) PCT Filed: Apr. 26, 2022

(86) PCT No.: PCT/CN2022/089378
§ 371 (c)(1),
(2) Date: Oct. 3, 2022

(87) PCT Pub. No.: WO2023/273574
PCT Pub. Date: Jan. 5, 2023

(65) Prior Publication Data
US 2024/0218902 A1 Jul. 4, 2024

(30) Foreign Application Priority Data

Jun. 29, 2021 (CN) .......................... 202110726724.4
Dec. 10, 2021 (CN) .......................... 202111506433.0

(51) Int. Cl.
*H05K 5/00* (2006.01)
*F16C 11/04* (2006.01)
*H04M 1/02* (2006.01)

(52) U.S. Cl.
CPC ............. *F16C 11/04* (2013.01); *H04M 1/022* (2013.01); *H04M 1/0268* (2013.01)

(58) Field of Classification Search
USPC ........................................... 361/807
See application file for complete search history.

(56) References Cited

U.S. PATENT DOCUMENTS 11,175,695 B2  11/2021  Lin
11,223,710 B2   1/2022  Cheng
(Continued)

FOREIGN PATENT DOCUMENTS

CN      107831836 A      3/2018
CN      207977988 U     10/2018
(Continued)

*Primary Examiner* — Hung S. Bui

(57) ABSTRACT

This application provides a rotating mechanism, a support apparatus, and a terminal with a foldable screen. A problem that a rotating part with a large volume affects lightening and thinning of an existing terminal with a foldable screen is resolved. A transmission assembly is in a transmission connection to a first swing arm and a second swing arm, so that the first swing arm and the second swing arm rotate between a folded position and an unfolded position. When the first swing arm and the second swing arm rotate from the folded position to the unfolded position, a connection plate moves in a direction away from the shaft cover, and when the first swing arm and the second swing arm rotate from the unfolded position to the folded position, the connection plate moves in a direction close to the shaft cover.

12 Claims, 18 Drawing Sheets

(56) References Cited

U.S. PATENT DOCUMENTS

| | | | |
|---|---|---|---|
| 2019/0174645 A1 | 6/2019 | Jeon et al. | |
| 2021/0076511 A1* | 3/2021 | Yang | ................... H05K 5/0226 |
| 2021/0368032 A1 | 11/2021 | Liao et al. | |
| 2022/0263930 A1 | 8/2022 | Koh et al. | |

FOREIGN PATENT DOCUMENTS

| | | | |
|---|---|---|---|
| CN | 110138916 | A | 8/2019 |
| CN | 110213417 | A | 9/2019 |
| CN | 110267475 | A | 9/2019 |
| CN | 110891103 | A | 3/2020 |
| CN | 111696431 | A | 9/2020 |
| CN | 111698356 | A | 9/2020 |
| CN | 111726436 | A | 9/2020 |
| CN | 111770223 | A | 10/2020 |
| CN | 112855741 | A | 5/2021 |
| CN | 113194167 | A | 7/2021 |
| CN | 114446164 | A | 5/2022 |
| WO | 2018210188 | A1 | 11/2018 |
| WO | 2019134696 | A1 | 7/2019 |
| WO | 2020186889 | A1 | 9/2020 |
| WO | 2021006371 | A1 | 1/2021 |

* cited by examiner

ROTATING MECHANISM, SUPPORT APPARATUS, AND TERMINAL WITH FOLDABLE SCREEN

CROSS-REFERENCE TO RELATED APPLICATIONS

This application is a national stage of International Application No. PCT/CN2022/089378, filed on Apr. 26, 2022, which claims priority to Chinese Patent Application No. 202110726724.4, filed on Jun. 29, 2021 and Chinese Patent Application No. 202111506433.0, filed on Dec. 10, 2021. All of the aforementioned applications are hereby incorporated by reference in their entireties.

TECHNICAL FIELD

This application relates to the technical field of terminals with a foldable screen, and in particular, to a rotating mechanism, a support apparatus, and a terminal with a foldable screen.

BACKGROUND

With the advancement in science and technology, an era of a large-screen intelligent terminal is approaching. To resolve a problem that a conventional tablet computer is large in volume and inconvenient to carry, and a problem that a screen of a mobile phone is small, a terminal with a foldable screen emerges.

A large screen is shown when the terminal with a foldable screen is unfolded. When the terminal with a foldable screen is folded, a bent part of the screen has a downward shift compared with an unfolded state. Therefore, parts inside the terminal with a foldable screen need to be correspondingly shifted downward, so as to avoid the screen.

In an existing terminal with a foldable screen, a large quantity of parts inside the terminal with a foldable screen need to be shifted downward to avoid a bent part of a screen, and a volume is large. Consequently, a downward shift by a large distance cannot be implemented in a small space, which affects overall lightening and thinning of the terminal with a foldable screen.

SUMMARY

Embodiments of this application provide a rotating mechanism, a support apparatus, and a terminal with a foldable screen, so that the terminal with a foldable screen can shift downward by a large distance in a small space, to avoid a screen, so as to facilitate overall lightening and thinning of the terminal with a foldable screen.

To achieve the foregoing objective, the following technical solutions are used in the embodiments of this application:

According to a first aspect, a rotating mechanism is provided, including a shaft cover and at least one folding assembly, where the folding assembly includes a connection plate, a first swing arm, a second swing arm, and a transmission assembly. A surface that is of the connection plate and that is away from the shaft cover is a lamination surface, and the lamination surface is used for lamination to a part of a foldable screen. The connection plate can be stretched and deformed in a first direction, the first direction is parallel to the lamination surface, and the connection plate has, in the first direction, a first side and a second side that opposite to each other. The first swing arm is disposed on the first side of the connection plate, and is separately rotatably connected to the connection plate and the shaft cover. The second swing arm is disposed on the second side of the connection plate, and is separately rotatably connected to the connection plate and the shaft cover. The transmission assembly is in a transmission connection to the first swing arm and the second swing arm, and the transmission assembly is configured to drive the first swing arm and the second swing arm to rotate in reverse directions, so that the first swing arm and the second swing arm rotate between a folded position and an unfolded position. In a process in which the first swing arm and the second swing arm rotate from the folded position to the unfolded position, the connection plate is stretched and deformed, and moves in a direction away from the shaft cover; and in a process in which the first swing arm and the second swing arm rotate from the unfolded position to the folded position, the connection plate is stretched and deformed, and moves in a direction close to the shaft cover.

In the rotating mechanism provided in this embodiment of the present invention, both the first swing arm and the second swing arm are rotatably connected to the shaft cover, and the first swing arm is in a transmission connection to the second swing arm by using the transmission assembly, so that the first swing arm and the second swing arm can rotate in reverse directions. In addition, the connection plate is separately rotatably connected to the first swing arm and the second swing arm. Therefore, in a rotation process, the first swing arm and the second swing arm each can form an included angle with the connection plate, or are flush with the lamination surface of the connection plate. In addition, in the rotation process of the first swing arm and the second swing arm, the connection plate is stretched and deformed in the first direction, and the connection plate moves in the direction close to or away from the shaft cover. Compared with the conventional technology, there is no other structure between the connection plate and the shaft cover in this application. Therefore, when the first swing arm and the second swing arm are in the unfolded position, a distance between the connection plate and the shaft cover is reduced. In addition, in the process in which the first swing arm and the second swing arm rotate from the unfolded position to the folded position, the connection plate can be driven by the first swing arm and the second swing arm to move in the direction close to the shaft cover, so as to avoid the foldable screen. Therefore, the rotating mechanism provided in this application has a smaller overall volume and fewer components. This further facilitates overall lightening and thinning of the terminal with a foldable screen.

In some embodiments of the present invention, the connection plate includes a first sub-plate and a second sub-plate, where at least a part of the first sub-plate is plug-connected to at least a part of the second sub-plate, and the first sub-plate is slidably connected to the second sub-plate. Because the first sub-plate and the second sub-plate are plug-connected to each other and slidably connected, when the connection plate moves in the direction away from or close to the shaft cover, can simultaneously slide in a direction away from or close to each other, so as to smoothly move with the first swing arm and the second swing arm.

In some embodiments of the present invention, the first sub-plate includes a first plate body and a first comb structure, where the first comb structure is located on one side that is of the first plate body and that is close to the second sub-plate, and is connected to the first plate body. The second sub-plate includes a second plate body and a second comb structure, where the second comb structure is located on one side that is of the second plate body and that is close to the first sub-plate, and is connected to the second plate body. The first comb structure and the second comb structure are plug-connected to each other. The first comb structure and the second comb structure are plug-connected to each other, so as to increase an area of a contact surface when the first sub-plate and the second sub-plate are plug-connected to each other, thereby improving support strength between the first sub-plate and the second sub-plate.

In some embodiments of the present invention, the first comb structure includes a plurality of first bumps, and there is a first gap between two adjacent first bumps. The second comb structure includes a plurality of second bumps, and there is a second gap between two adjacent second bumps. Each of the plurality of first bumps is inserted into a corresponding second gap, and each of the plurality of second bumps is inserted into a corresponding first gap. In this way, the first comb structure and the second comb structure can be disposed in a same structure, and then the first comb structure and the second comb structure are correspondingly plug-connected in a staggered manner, so that the first sub-plate and the second sub-plate can be plug-connected to each other, thereby reducing machining difficulty.

In some embodiments of the present invention, the first bump has a first sidewall, the first sidewall faces the first gap, the second bump has a second sidewall, and the second sidewall faces the second gap. The first comb structure further includes sliding slots, the sliding slots are disposed on at least some of a plurality of first sidewalls, and the sliding slot penetrates through a sidewall that is of the first bump and that faces the second plate body. The first comb structure further includes sliders, the sliders are disposed on at least some of a plurality of second sidewalls, the sliders are disposed corresponding to the sliding slots, and each slider slidably cooperates with a corresponding sliding slot. In this way, the support strength between the first sub-plate and the second sub-plate can be further improved through corresponding sliding cooperation between the sliding slots on the first sidewalls and the sliders on the second sidewalls, so that an overall structure is more stable.

In some embodiments of the present invention, the sliding slot is disposed on each first sidewall, and the slider is disposed on each second sidewall. To be specific, the sliding slot is disposed on each of two opposite sidewalls of the first bump, and the slider is disposed on each of two opposite sidewalls of the second bump. In this way, after the first comb structure and the second comb structure are plug-connected to each other, two opposite sidewalls of each first bump and two opposite sidewalls of each second bump are all supported, so that overall stress is more balanced, and the support strength is further improved.

In some embodiments of the present invention, the first bump has a first sidewall, the first sidewall faces the first gap, the second bump has a second sidewall, and the second sidewall faces the second gap. The first comb structure further includes first step surfaces, and the first step surfaces are disposed on at least some of a plurality of first sidewalls. The second comb structure further includes second step surfaces, the second step surfaces are disposed on at least some of a plurality of second sidewalls, and the first step surfaces and the second step surfaces are parallel to and laminated to each other. The first step surfaces and the second step surfaces are respectively disposed on the first sidewalls and the second sidewalls, and are laminated to each other, so that the first bumps and the second bumps support each other, thereby further improving the support strength after the first bumps and the second bumps are plug-connected to each other.

In some embodiments of the present invention, the first step surface is disposed on each first sidewall, and the second step surface is disposed on each second sidewall. To be specific, the first step surface is disposed on each of two opposite sidewalls of the first bump, and the second step surface is disposed on each of two opposite sidewalls of the second bump. In this way, after the first comb structure and the second comb structure are plug-connected to each other, two opposite sidewalls of each first bump and two opposite sidewalls of each second bump are all supported, so that overall stress is more balanced, and the support strength is further improved.

In some embodiments of the present invention, all the first step surfaces face the shaft cover, all the second step surfaces are away from the shaft cover, and the first step surfaces and the second step surfaces are all parallel to the lamination surface. In this way, a structure of the first step surface and a structure of the second step surface can be the same. When the first comb structure and the second comb structure are plug-connected to each other, only step surfaces of one of the first comb structure and the second comb structure need to face the shaft cover, and step surfaces of the other of the first comb structure and the second comb structure are away from the shaft cover, so that the first comb structure and the second comb structure can be correspondingly plug-connected. There is no need to separately machine a first step surface and a second step surface of different structures. This reduces the machining difficulty.

In some embodiments of the present invention, a sliding slot is disposed on the first sub-plate, the sliding slot is disposed on a sidewall that is of the first sub-plate and that faces the second sub-plate, the sliding slot penetrates through two opposite sidewalls on the first sub-plate in a direction parallel to the lamination surface and perpendicular to the first direction, and the second sub-plate is inserted into the sliding slot. In this way, only the sliding slot needs to be disposed on the first sub-plate, and the second sub-plate is inserted into the sliding slot, so that the first sub-plate and the second sub-plate can be plug-connected to each other and can slide relative to each other. This can greatly reduce the machining difficulty of the first sub-plate and the second sub-plate, greatly reduce process difficulty, and improve production efficiency.

In some embodiments of the present invention, a first mounting hole is provided on the first swing arm, and a second mounting hole is provided on the second swing arm. The folding assembly further includes a first connection convex lug, a first pin shaft, a second connection convex lug, and a second pin shaft. The first connection convex lug is disposed on a surface that is of the first sub-plate and that faces the first swing arm, and is connected to the first sub-plate, and a first connection hole is provided on the first connection convex lug. The first pin shaft is inserted into the first connection hole and the first mounting hole, and the first pin shaft is parallel to the lamination surface and perpendicular to the first direction. The second connection convex lug is disposed on a surface that is of the second sub-plate and that faces the second swing arm, and is connected to the second sub-plate, and a second connection hole is provided on the second connection convex lug. The second pin shaft is inserted into the second connection hole and the second mounting hole, and the second pin shaft is parallel to the lamination surface and perpendicular to the first direction. The first swing arm is rotatably connected to the first sub-plate by using the first pin shaft, and the second swing arm is rotatably connected to the second sub-plate by using the second pin shaft. When the first swing arm and the second swing arm rotate relative to the shaft cover, the first pin shaft can rotate about a rotation axis between the first swing arm and the shaft cover, and the second pin shaft can rotate about a rotation axis between the second swing arm and the shaft cover, so that in the rotation process of the first swing arm and the second swing arm, the first sub-plate and the second sub-plate can move in a direction perpendicular to the lamination surface.

In some embodiments of the present invention, the transmission assembly includes a first connection part, a first rotating shaft, a first gear, a second connection part, a second rotating shaft, and a second gear. The first connection part is disposed on one side that is of the first swing arm and that is close to the shaft cover, and is connected to the first swing arm. The first rotating shaft passes through the first connection part and is fixedly connected to the first connection part, the first rotating shaft is rotatably connected to the shaft cover, and the first rotating shaft is parallel to the lamination surface and perpendicular to the first direction. The first gear is fastened onto the first rotating shaft, and is coaxially disposed with the first rotating shaft. The second connection part is disposed on one side that is of the second swing arm and that is close to the shaft cover, and is connected to the second swing arm. The second rotating shaft passes through the second connection part and is fixedly connected to the second connection part, and the second rotating shaft is rotatably connected to the shaft cover, and is parallel to the first rotating shaft. The second gear is fastened onto the second rotating shaft, and is coaxially disposed with the second rotating shaft, and the second gear is engaged with the first gear. The first swing arm is rotatably connected to the shaft cover by using the first rotating shaft, and the second swing arm is rotatably connected to the shaft cover by using the second rotating shaft. In addition, the first rotating shaft, the second rotating shaft, the first pin shaft, and the second pin shaft are parallel to each other. Therefore, when the first swing arm and the second swing arm rotate, the first pin shaft can rotate in a circumferential direction of the first rotating shaft, and the second pin shaft can rotate in a circumferential direction of the second rotating shaft, so that the first pin shaft and the second pin shaft drive the first sub-plate and the second sub-plate to move in the direction close to or away from the shaft cover in the direction perpendicular to the lamination surface.

In some embodiments of the present invention, the transmission assembly further includes N intermediate gears, where the N intermediate gears are sequentially engaged, and are disposed between the first gear and the second gear; the N sequentially engaged intermediate gears are engaged with the first gear and the second gear; and N is greater than 0, and N is an even number. An even number of intermediate gears are disposed between the first gear and the second gear. On the one hand, the first gear and the second gear can synchronously rotate in reverse directions. On the other hand, a diameter of each gear can be reduced, that is, a volume of a component can be reduced. This further facilitates lightening and thinning of the terminal with a foldable screen.

According to a second aspect, a support apparatus is provided, including a first housing, a second housing, and the rotating mechanism according to any one of the foregoing solutions, where the rotating mechanism is located between the first housing and the second housing, the first swing arm of the rotating mechanism is connected to the first housing, and the second swing arm of the rotating mechanism is connected to the second housing. Because the support apparatus provided in this embodiment of the present invention includes the rotating mechanism according to any one of the foregoing solutions, a same technical problem can be resolved, and a same technical effect can be obtained.

According to a third aspect, a terminal with a foldable screen is provided, including a foldable screen and a support apparatus, where the foldable screen includes a first part, a second part, and a third part, and the third part is located between the first part and the second part. The support apparatus is the support apparatus according to the foregoing solution, the first part is fastened onto the first housing, the second part is fastened onto the second housing, and the third part is supported on the lamination surface of the rotating mechanism. Because the terminal with a foldable screen provided in this embodiment of the present invention includes the support apparatus according to the foregoing solution, a same technical problem can be resolved, and a same technical effect can be obtained.

Figure 1:
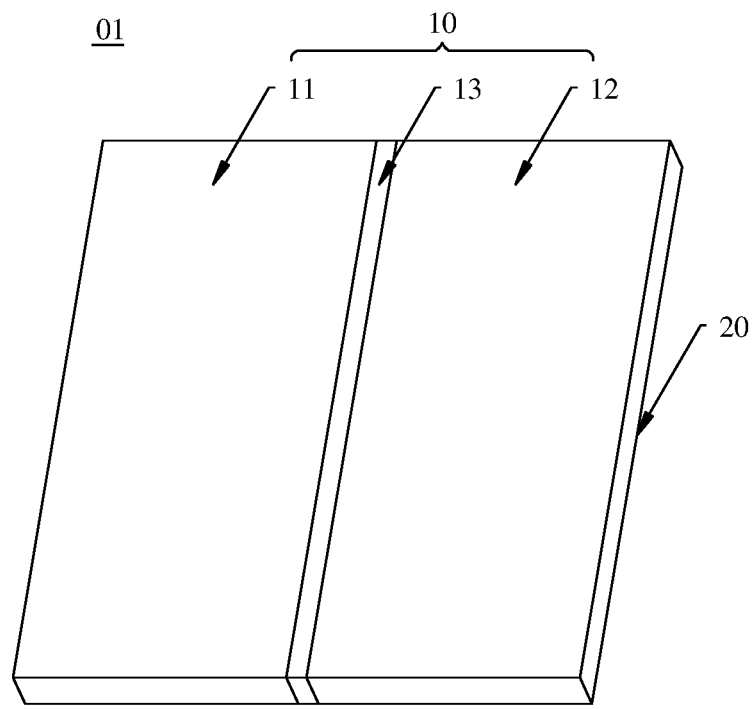
FIG. 1 is a perspective view of a terminal with a foldable screen according to an embodiment of this application.

Reference numerals: 01—terminal with a foldable screen; 10—foldable screen; 11—first part; 12—second part; 13—third part; 20—support apparatus; 21—rotating mechanism; 201—elevator; 202—fastening base; 203—screw; 204—spring; 205—first support part; 206—second support part; 207—avoidance gap; 208—first rotating shaft; 209—second rotating shaft; 200—folding assembly; 210—first swing arm; 211—first mounting hole; 212—avoidance groove; 220—second swing arm; 221—second mounting hole; 230—connection plate; 240—first sub-plate; 241—first connection convex lug; 2411—first connection hole; 242—first plate body; 243—first comb structure; 2431—first bump; 2431a—first sidewall; 2432—first gap; 2433—sliding slot; 2434—first step surface; 244—sliding slot; 250—second sub-plate; 251—second connection convex lug; 2511—second connection hole; 252—second plate body; 253—second comb structure; 2531—second bump; 2531a—second sidewall; 2532—second gap; 2533—slider; 2534—second step surface; 260—transmission assembly; 261—first connection part; 261a—first through hole; 262—first rotating shaft; 262a—flat shaft section; 263—first gear; 264—second connection part; 264a—second through hole; 265—second rotating shaft; 266—second gear; 267—intermediate gear; 270—first pin shaft; 280—second pin shaft; 300—shaft cover; 22—first housing; 23—second housing; M1—lamination surface; M2—first lamination plane; and M3—second lamination plane.

DESCRIPTION OF EMBODIMENTS

The following describes technical solutions in embodiments of this application with reference to accompanying drawings in embodiments of this application. Apparently, the described embodiments are merely some rather than all embodiments of this application.

Terms such as "first" and "second" described below are used merely for description purposes, and are not understood to indicate or imply relative importance or implicitly indicate a quantity of indicated technical characteristics. Therefore, a characteristic defined with "first", "second", and the like may explicitly or implicitly include one or more characteristics.

In addition, in this application, azimuth terms such as "upper" and "lower" are defined relative to orientations in which components in the accompanying drawings are placed. It should be understood that these directional terms are relative concepts and are used for relative description and clarification, and may be correspondingly changed based on changes in the orientations in which the components in the accompanying drawings are placed.

In this application, unless otherwise specified and defined, a term "connection" should be understood in a broad sense. For example, a "connection" may be a fixed connection, may be a detachable connection, or may be integration, and may be a direct connection or an indirect connection implemented by using an intermediate medium.

This application provides a terminal with a foldable screen, and the terminal with a foldable screen may be a terminal with a foldable screen with a foldable screen. The terminal with a foldable screen includes but is not limited to a mobile phone, a tablet personal computer (tablet personal computer), a laptop computer (laptop computer), and a personal digital assistant (personal digital assistant, PDA). In this embodiment, that a terminal 01 with a foldable screen shown in FIG. 1 is a mobile phone is used as an example for description.

Specifically, refer to FIG. 1. FIG. 1 is a perspective view of a terminal 01 with a foldable screen according to some embodiments of this application. The terminal 01 with a foldable screen includes a foldable screen 10 and a support apparatus 20. The foldable screen 10 is configured to display an image, a video, and the like. The foldable screen 10 includes a first part 11, a second part 12, and a third part 13. The third part 13 is disposed between the first part 11 and the second part 12. When the foldable screen 10 is folded, the third part 13 is bent, and the first part 11 is disposed opposite to the second part 12. At least the third part 13 of the foldable screen 10 is made of a flexible material. The first part 11 and the second part 12 may be made of a flexible material, may be made of a rigid material, or one of the first part 11 and the second part 12 may be made of a flexible material and the other of the first part 11 and the second part 12 may be made of a rigid material. This is not specifically limited in this application.

The foldable screen 10 may be an organic light-emitting diode (organic light-emitting diode, OLED) screen, a micro organic light-emitting diode (micro organic light-emitting diode) screen, a quantum dot light-emitting diode (quantum dot light emitting diodes, QLED), a liquid crystal display (liquid crystal display, LCD), or the like.

Figure 2:
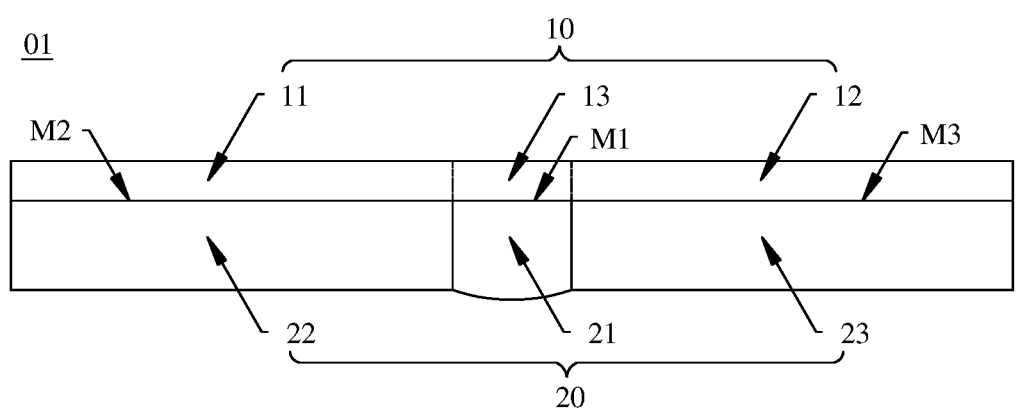
FIG. 2 is a main view of a terminal with a foldable screen in an unfolded state according to an embodiment of this application.

FIG. 2 is a main view of the terminal 01 with a foldable screen shown in FIG. 1. The foldable screen 10 is supported on the support apparatus 20. The support apparatus 20 includes a first housing 22, a second housing 23, and a rotating mechanism 21. The rotating mechanism 21 is connected between the first housing 22 and the second housing 23. The first housing 22 has a first lamination plane M2, and the first part 11 of the foldable screen 10 is supported on and laminated to the first lamination plane M2. The second housing 23 has a second lamination plane M3, and the second part 12 of the foldable screen 10 is supported on and laminated to the second lamination plane M3. The rotating mechanism 21 has a lamination surface M1, and the third part 13 of the foldable screen 10 is supported on and laminated to the lamination surface M1. The first housing 22 and the second housing 23 are rotatably connected by using the rotating mechanism 21, so that the terminal 01 with a foldable screen can rotate between an unfolded position and a folded position.

Still refer to FIG. 1 and FIG. 2. FIG. 1 and FIG. 2 are schematic diagrams of structures of the terminal 01 with a foldable screen in an unfolded state. When the terminal 01 with a foldable screen is in the unfolded position, the first lamination plane M2, the second lamination plane M3, and the lamination surface M1 are in a same plane, so that the foldable screen 10 is completely unfolded, thereby ensuring flatness of the foldable screen 10. In this state, large screen display can be implemented, and better use experience can be brought to a user.

Figure 3:
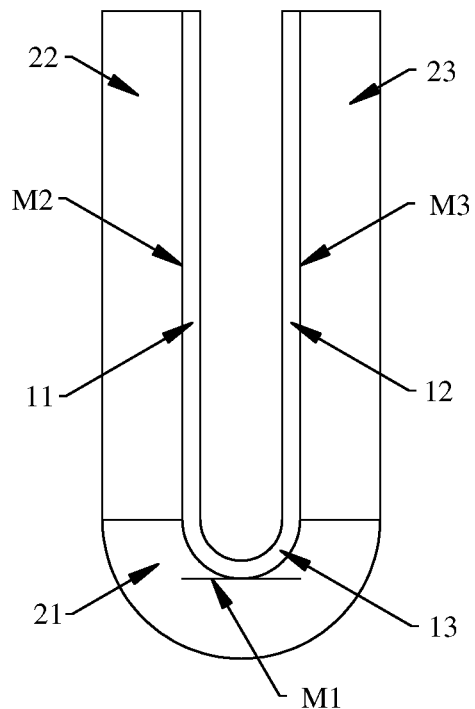
FIG. 3 is a main view of a terminal with a foldable screen in a folded state according to an embodiment of this application.

FIG. 3 is a schematic diagram of a structure of the terminal 01 with a foldable screen shown in FIG. 2 in a folded state. When the terminal 01 with a foldable screen is in the folded position, the first part 11 is disposed opposite to the second part 12, and the third part 13 is in a bent state. The support apparatus 20 externally protects the foldable screen 10, and the foldable screen 10 is invisible to the user, to prevent the foldable screen 10 from being scratched or damaged, thereby effectively protecting the foldable screen 10.

Figure 4:
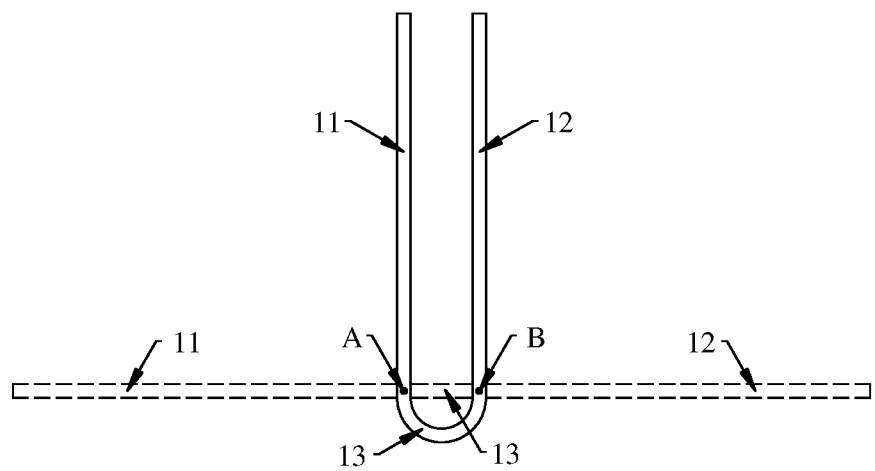
FIG. 4 is a comparison diagram of structures of a foldable screen in a folded state and an unfolded state according to an embodiment of this application.

FIG. 4 is a comparison diagram of structures of the foldable screen 10 shown in FIG. 3 in the unfolded position and the folded position. In FIG. 4, the foldable screen 10 represented by a dashed line is in the unfolded position, and the foldable screen 10 represented by a solid line is in the folded position. When the foldable screen 10 rotates from the unfolded position to the folded position, the first part 11 rotates around a point A in the figure (the point A is a connection point between the first part and the third part), and the second part 12 rotates around a point B in the figure (the point B is a connection point between the second part and the third part). When a position of the point A and a position of the point B remain unchanged, the third part 13 of the foldable screen 10 has a downward shift at the folded position compared with the unfolded position. If the rotating mechanism 21 in the support apparatus 20 does not avoid the third part 13 that shifts downward, reliability of the screen will be reduced.

Figure 5:
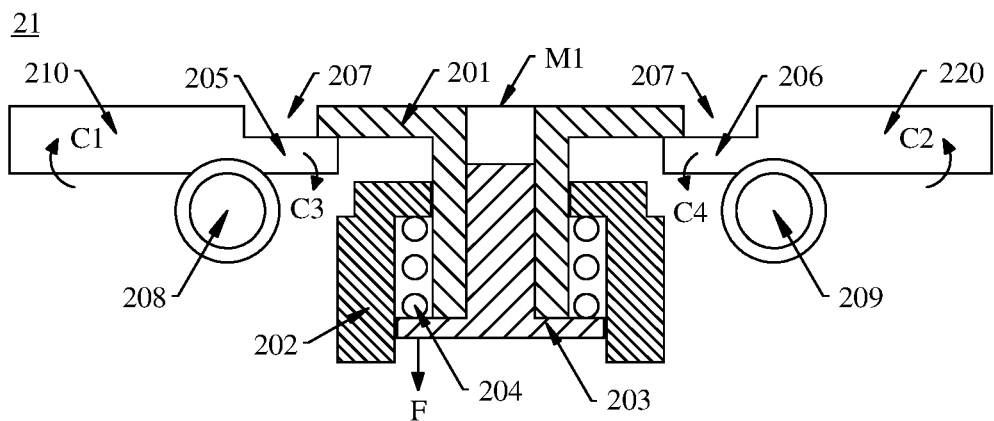
FIG. 5 is a schematic diagram of a structure of a rotating mechanism of a terminal with a foldable screen provided in a related technology.

To avoid the third part 13 of the foldable screen 10, refer to FIG. 5. FIG. 5 shows a rotating mechanism 21 provided in a related technology according to this application. The rotating mechanism 21 includes an elevator 201, a fastening base 202, a screw 203, a spring 204, a first swing arm 210, a second swing arm 220, a first support part 205, a second support part 206, a first rotating shaft 208, and a second rotating shaft 209.

The first swing arm 210 and the second swing arm 220 are respectively located on two opposite sides of the elevator 201, the first swing arm 210 is configured to connect to the first housing 22 in FIG. 2 or FIG. 3, the second swing arm 220 is configured to connect to the second housing 23 in FIG. 2 or FIG. 3, and the first swing arm 210 and the second swing arm 220 can rotate relative to the fastening base 202. The first swing arm 210 rotates around the first rotating shaft 208, the second swing arm 220 rotates around the second rotating shaft 209, positions of the first rotating shaft 208 and the second rotating shaft 209 relative to the fastening base 202 are fixed, and the first rotating shaft 208 and the second rotating shaft 209 are parallel to each other. Therefore, the first housing 22 and the second housing 23 can be rotatably connected, so that the terminal 01 with a foldable screen can rotate between the unfolded position and the folded position.

In addition, the lamination surface M1 is formed on a surface that is of the elevator 201 and that is away from the fastening base 202. The fastening base 202 and the screw 203 are located on one side that is of the elevator 201 and that is away from the lamination surface M1. The screw 203 is fastened onto the elevator 201. The screw 203 and a part of the elevator 201 are slidably inserted into the fastening base 202 in an elevation direction of the elevator 201. The spring 204 is sleeved onto the part that is of the elevator 201 and that extends into the fastening base 202, and abuts between the screw 203 and the fastening base 202. The first support part 205 is fastened onto the first swing arm 210, and the second support part 206 is fastened onto the second swing arm 220.

When the terminal 01 with a foldable screen is in the unfolded position, still refer to FIG. 5. The elevator 201 is supported on the first support part 205 and the second support part 206. In this case, the spring 204 is compressed, and an elastic force F away from the elevator 201 is applied to the screw 203. When the terminal 01 with a foldable screen rotates from the unfolded position to the folded position, the first swing arm 210 and the second swing arm 220 rotate upward (directions C1 and C2 in the figure) around the first rotating shaft 208 and the second rotating shaft 209, respectively; and the first support part 205 and the second support part 206 rotate downward (directions C3 and C4 in the figure) around the first rotating shaft 208 and the second rotating shaft 209, respectively. Because both the first support part 205 and the second support part 206 rotate downward and are separated from the elevator 201, the elevator 201 moves downward under the action of the elastic force F of the spring 204, so as to avoid the third part 13 of the foldable screen 10 shown in FIG. 4. The spring 204 is in a free state when the foldable screen 10 is in the folded position.

Then, when the terminal 01 with a foldable screen rotates from the folded position to the unfolded position, the first swing arm 210 and the second swing arm 220 rotate downward (opposite directions of C1 and C2 in the figure) around the first rotating shaft 208 and the second rotating shaft 209, respectively; and the first support part 205 and the second support part 206 rotate upward (opposite directions of C3 and C4 in the figure) around the first rotating shaft 208 and the second rotating shaft 209, respectively, and push the elevator 201 to move upward. In addition, the spring 204 is compressed again for a next lowering operation of the elevator 201.

Because components such as the fastening base 202 exist in the rotating mechanism 21, in addition to a thickness of the elevator 201, a thickness of the rotating mechanism 21 includes a thickness of a part of the screw 203 and a thickness of the fastening base 202. Consequently, an overall thickness of the terminal 01 with a foldable screen is increased. This affects overall lightening and thinning of the terminal 01 with a foldable screen.

In addition, the first swing arm 210 and the second swing arm 220 need to rotate toward each other. If both the first swing arm 210 and the second swing arm 220 abut against the elevator 201, the elevator 201 prevents the first swing arm 210 and the second swing arm 220 from rotating upward. Therefore, an avoidance gap 207 needs to be reserved between the first swing arm 210 and the elevator 201 and between the second swing arm 220 and the elevator 201, so that the first swing arm 210 and the second swing arm 220 can smoothly rotate.

However, in this case, when the terminal 01 with a foldable screen is in the unfolded position, the foldable screen 10 that covers the avoidance gaps 207 cannot be supported. Consequently, when the user touches the areas, recesses are formed. Consequently, screen flatness is affected, and user experience is reduced.

Figure 6:
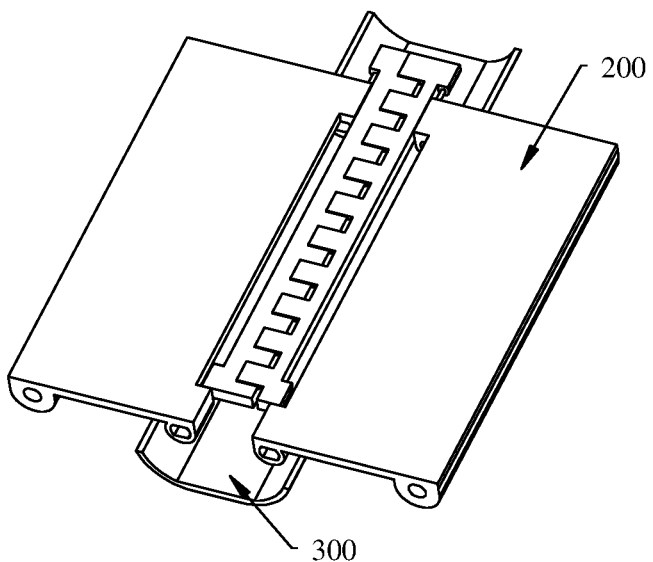
FIG. 6 is a perspective view of a rotating mechanism according to an embodiment of this application.

To resolve the foregoing problem, refer to FIG. 6. FIG. 6 is a perspective view of a rotating mechanism 21 according to some embodiments of this application. The rotating mechanism 21 provided in this application includes a shaft cover 300 and at least one folding assembly 200. The folding assembly 200 is disposed on the shaft cover 300, and is configured to support the third part 13 of the foldable screen 10.

For ease of description of the following embodiments, an XYZ coordinate system is established, where a length direction of the folding assembly 200 is defined as an X-axis, a width direction of the folding assembly 200 is a Y-axis direction, and a thickness direction of the folding assembly 200 is a Z-axis direction. It may be understood that the coordinate system of the folding assembly 200 may be flexibly set based on an actual requirement. An example is merely provided in this application, and cannot be considered as a special limitation on this application.

Only one folding assembly 200 may be disposed, and a length of one folding assembly 200 is adapted to a length of the shaft cover 300, so that the third part 13 of the foldable screen 10 can be supported in a length direction of the third part 13. Alternatively, a plurality of folding assemblies 200 may be disposed, and the plurality of folding assemblies 200 are evenly distributed in a length direction of the shaft cover 300, so that a support force for the third part 13 of the foldable screen 10 can be balanced, thereby improving flatness when the foldable screen 10 is in the unfolded position. This is not specifically limited in this application. An example in which one folding assembly 200 is disposed is used for description below.

Figure 7:
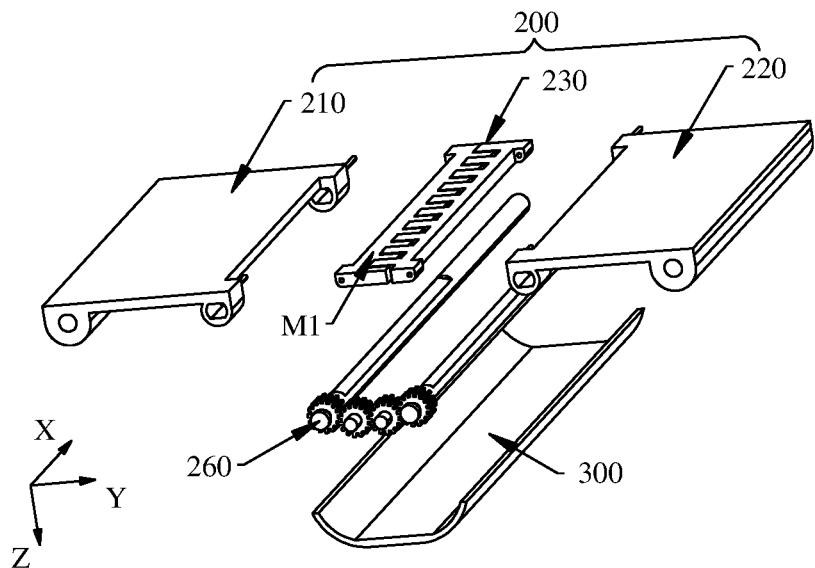
FIG. 7 is an exploded view of a rotating mechanism according to an embodiment of this application.

FIG. 7 is an exploded view of the rotating mechanism 21 shown in FIG. 6. The folding assembly 200 includes a connection plate 230, a first swing arm 210, and a second swing arm 220. A surface that is of the connection plate 230 and that is away from the shaft cover 300 is the lamination surface M1. The lamination surface M1 is configured to support the third part 13 of the foldable screen 10 shown in FIG. 2 and FIG. 3. The connection plate 230 can be stretched and deformed in a first direction, and the first direction is parallel to the lamination surface M1. The connection plate 230 has, in the first direction, a first side and a second side that opposite to each other. The first swing arm 210 is disposed on the first side of the connection plate 230, and is separately rotatably connected to the connection plate 230 and the shaft cover 300. The second swing arm 220 is disposed on the second side of the connection plate 230 disposed on the connection plate 230, and is separately rotatably connected to the connection plate 230 and the shaft cover 300.

Still refer to FIG. 7. The folding assembly 200 further includes a transmission assembly 260, where the transmission assembly 260 is in a transmission connection to the first swing arm 210 and the second swing arm 220, to drive the first swing arm 210 and the second swing arm 220 to rotate in reverse directions, so that the first swing arm 210 and the second swing arm 220 rotate between the unfolded position and the folded position.

Figure 8:
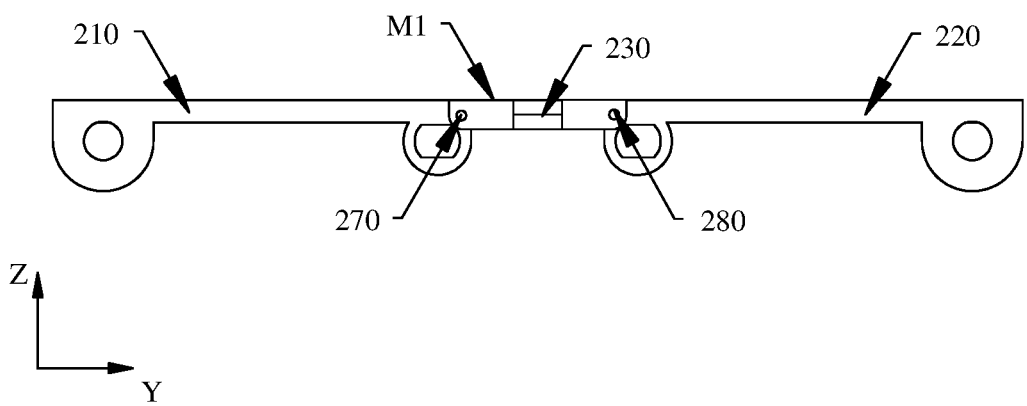
FIG. 8 is a main view of a folding assembly according to an embodiment of this application.

Specifically, refer to FIG. 8. FIG. 8 is a main view of an assembly structure of the first swing arm 210, the second swing arm 220, and the connection plate 230 in FIG. 7. The folding assembly 200 further includes a first pin shaft 270 and a second pin shaft 280, and the first pin shaft 270 and the second pin shaft 280 are parallel to each other and are disposed in an X direction. The first swing arm 210 is rotatably connected to the connection plate 230 by using the first pin shaft 270. The second swing arm 220 is rotatably connected to the connection plate 230 by using the second pin shaft 280.

Figure 9:
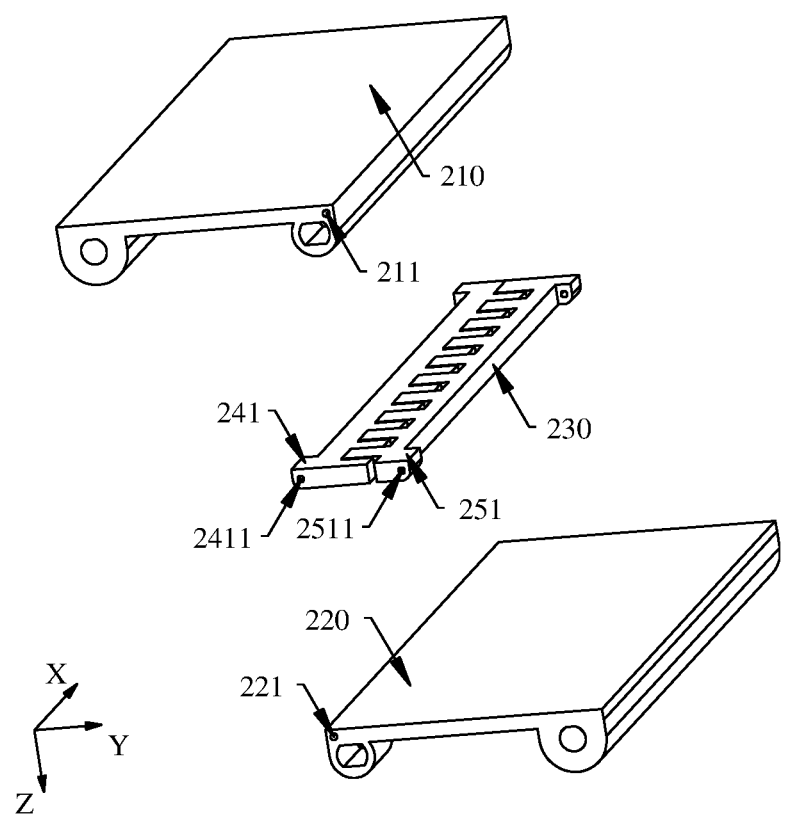
FIG. 9 is an exploded view of the folding assembly shown in FIG. 8.

In some embodiments, refer to FIG. 9. FIG. 9 is an exploded view of the first swing arm 210, the second swing arm 220, and the connection plate 230 shown in FIG. 8. A first connection convex lug 241 is disposed on a sidewall of the first side of the connection plate 230, a first connection hole 2411 is provided on the first connection convex lug 241, a second connection convex lug 251 is disposed on a sidewall of the second side of the connection plate 230, and a second connection hole 2511 is provided on the second connection convex lug 251. A first mounting hole 211 is provided on one side that is of the first swing arm 210 and that is close to the connection plate 230, and a second mounting hole 221 is provided on one side that is of the second swing arm 220 and that is close to the connection plate 230. The first pin shaft 270 is inserted into the first connection hole 2411 and the first mounting hole 211, and the second pin shaft 280 is inserted into the second connection hole 2511 and the second mounting hole 221. Therefore, the connection plate 230 is separately rotatably connected to the first swing arm 210 and the second swing arm 220.

Figure 10:
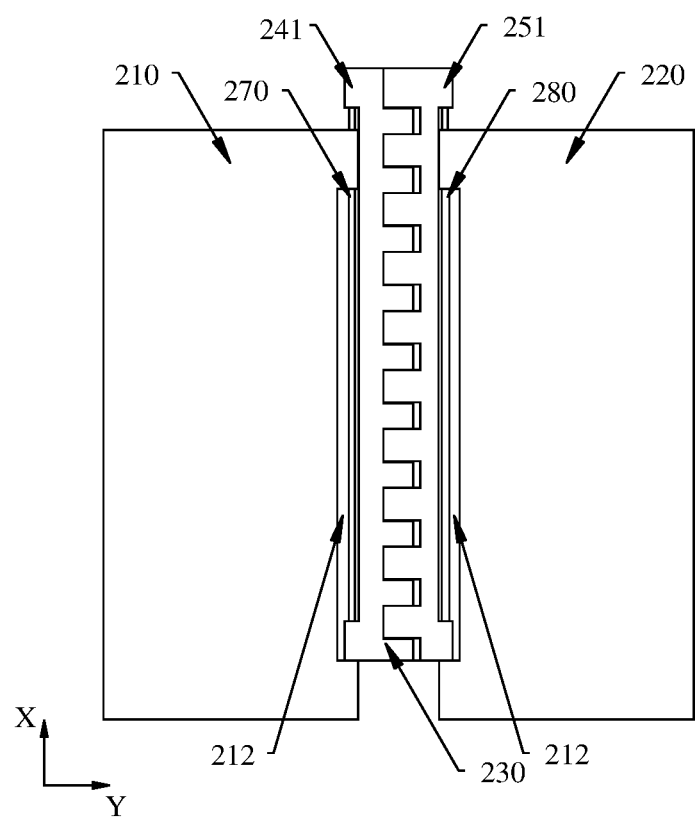
FIG. 10 is a top view of an assembly structure of the folding assembly shown in FIG. 9.

For example, refer to FIG. 10. FIG. 10 is a top view of an assembly structure of the first swing arm 210, the second swing arm 220, and the connection plate 230 shown in FIG. 9. A connection structure between the first swing arm 210 and the connection plate 230 and a connection structure between the second swing arm 220 and the connection plate 230 may be disposed as follows: An avoidance groove 212 is disposed on one side that is of each of the first swing arm 210 and the second swing arm 220 and that is close to the connection plate 230, one first connection convex lug 241 and one second connection convex lug 251 of the connection plate 230 are disposed in the avoidance grooves 212, and the other first connection convex lug 241 and the other second connection convex lug 251 are located outside the avoidance grooves 212. Then, the first swing arm 210 and the second swing arm 220 are separately rotatably connected to the connection plate 230 by using the first pin shaft 270 and the second pin shaft 280.

Figure 11:
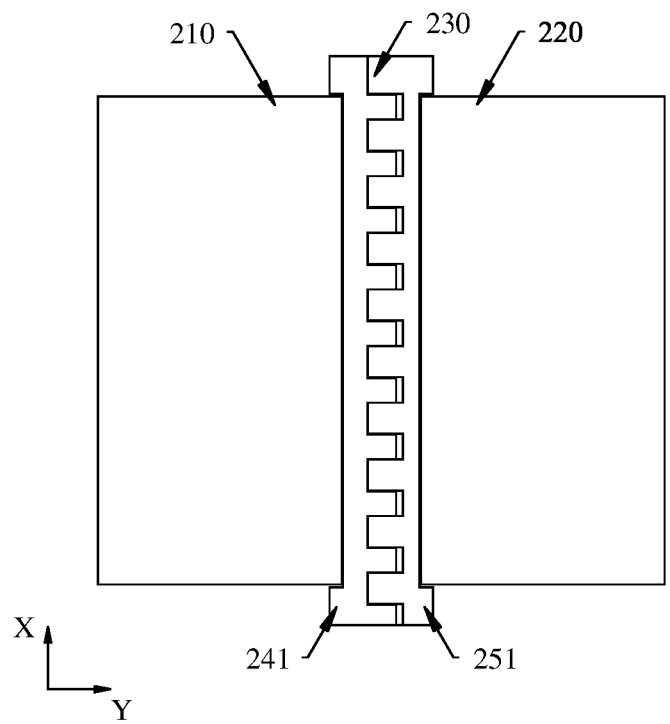
FIG. 11 is a top view of another assembly structure of the folding assembly shown in FIG. 9.

In addition, refer to FIG. 11. FIG. 11 is a top view of another assembly structure of the first swing arm 210, the second swing arm 220, and the connection plate 230 shown in FIG. 9. A connection structure between the first swing arm 210 and the connection plate 230 and a connection structure between the second swing arm 220 and the connection plate 230 may be alternatively disposed as follows: One end that is of the first swing arm 210 and that is close to the connection plate 230 is disposed between two first connection convex lugs 241, and one end that is of the second swing arm 220 and that is close to the connection plate 230 is disposed between two second connection convex lugs 251. Then, the first pin shaft 270 is inserted into the first mounting hole 211 and the first connection hole 2411, and the second pin shaft 280 is inserted into the second mounting hole 221 and the second connection hole 2511, so that the first swing arm 210 and the second swing arm 220 are separately rotatably connected to the connection plate 230. In this way, there is no need to dispose an avoidance groove 212 on each of the first swing arm 210 and the second swing arm 220, which helps reduce machining difficulty.

Figure 12:
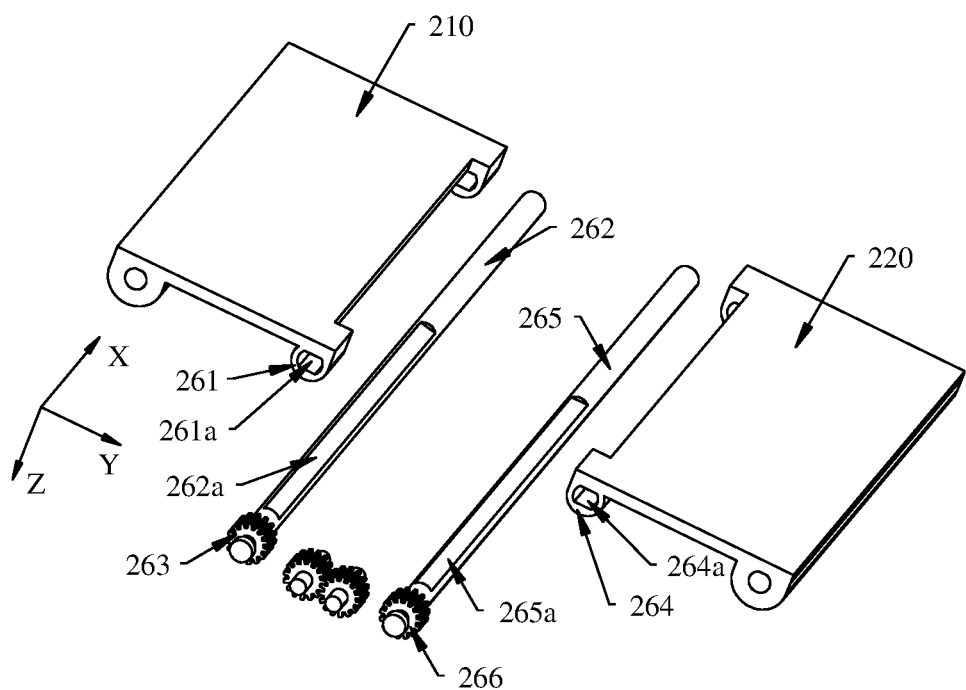
FIG. 12 is an exploded view of a transmission assembly according to this application.

On this basis, refer to FIG. 12. FIG. 12 is an exploded view of the transmission assembly in FIG. 7. The transmission assembly 260 includes a first connection part 261, a first rotating shaft 262, a first gear 263, a second connection part 264, a second rotating shaft 265, a second gear 266, and an even number of intermediate gears 267. Both the first rotating shaft 262 and the second rotating shaft 265 are disposed in parallel to the first pin shaft 270 and the second pin shaft 280, and both ends of each of the first rotating shaft 262 and the second rotating shaft 265 are rotatably connected to the shaft cover 300.

Figure 13:
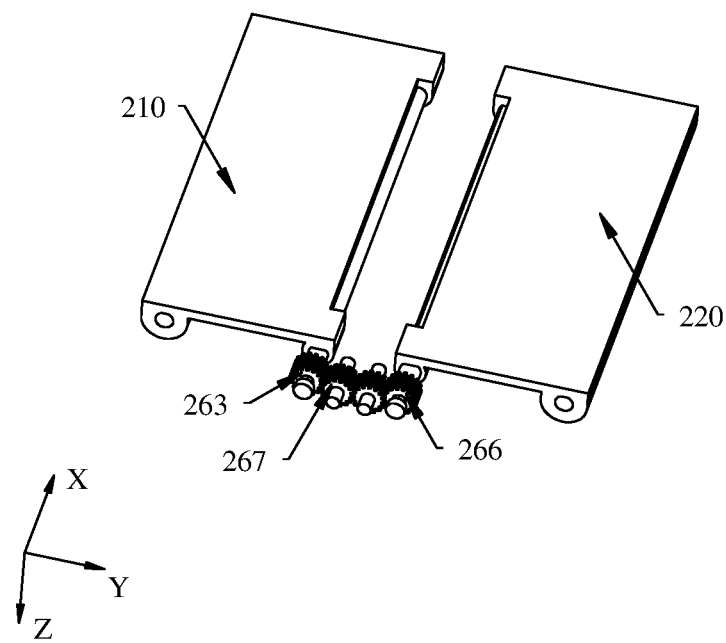
FIG. 13 is a perspective view of an assembly structure of the transmission assembly shown in FIG. 12.

Specifically, still refer to FIG. 12. The first connection part 261 is disposed on one side that is of the first swing arm 210 and that is close to the shaft cover 300, and is connected to the first swing arm 210 as an integral structure. A flat shaft section 262a is disposed at a middle part of the first rotating shaft 262, and a planar structure is correspondingly disposed on an inner wall of a through hole 261a provided on the first connection part 261. FIG. 13 is an assembly diagram of the transmission assembly in FIG. 12. The first rotating shaft 262 passes through the first connection part 261, and the planar structure of the first through hole 261a on the first connection part 261 cooperates with the flat shaft section 262a on the first rotating shaft 262, to implement positioning and avoid relative rotation between the first rotating shaft 262 and the first connection part 261. In addition, the first gear 263 is fastened onto the first rotating shaft 262, and is disposed coaxially with the first rotating shaft 262.

The second connection part 264 is disposed on one side that is of the second swing arm 220 and that is close to the shaft cover 300, and is connected to the second swing arm 220 as an integral structure. The second rotating shaft 265 passes through a second through hole 264a on the second connection part 264, and a connection structure between the second rotating shaft 265 and the second connection part 264 is the same as a connection structure between the first rotating shaft 262 and the first connection part 261. In addition, the second gear 266 is fastened onto the second rotating shaft 265, and is disposed coaxially with the second rotating shaft 265.

Still refer to FIG. 13. There are two intermediate gears 267. The two intermediate gears 267 are engaged with each other, one intermediate gear 267 is engaged with the first gear 263, the other intermediate gear 267 is engaged with the second gear 266, and the intermediate gear 267, the first gear 263, and the second gear 266 are the same in diameter and tooth quantity. In this way, the two intermediate gears 267 are disposed and engaged between the first gear 263 and the second gear 264, so that the first gear 263 and the second gear 266 can synchronously rotate in reverse directions, that is, the first rotating shaft 262 and the second rotating shaft 265 can synchronously rotate in reverse directions. Because the first rotating shaft 262 and the first connection part 261, and the second rotating shaft 265 and the second connection part 264 cannot rotate relative to each other. Therefore, the first connection part 261 and the second connection part 264 can drive the first swing arm 210 and the second swing arm 220 to synchronously rotate in reverse directions, so that the first swing arm 210 and the second swing arm 220 can rotate between the folded position and the unfolded position.

It should be noted that a quantity of intermediate gears 267 is an even number, and may be two, four, six, or eight. With an increase in the quantity of intermediate gears 267, sizes of the intermediate gears 267, the first gear 263, and the second gear 266 may be further reduced. This reduces an overall volume, and further facilitates lightening and thinning of the terminal 01 with a foldable screen. However, as the quantity of intermediate gears 267 increases, structural complexity of the rotating mechanism 21 increases. Therefore, to consider the thickness and the structural complexity of the rotating mechanism 21 at the same time, there are two intermediate gears 267 in the rotating mechanism 21 provided in this application. In this way, the quantity of intermediate gears 267 is moderate, and the thickness and the structural complexity of the rotating mechanism 21 can be considered at the same time.

Figure 14:
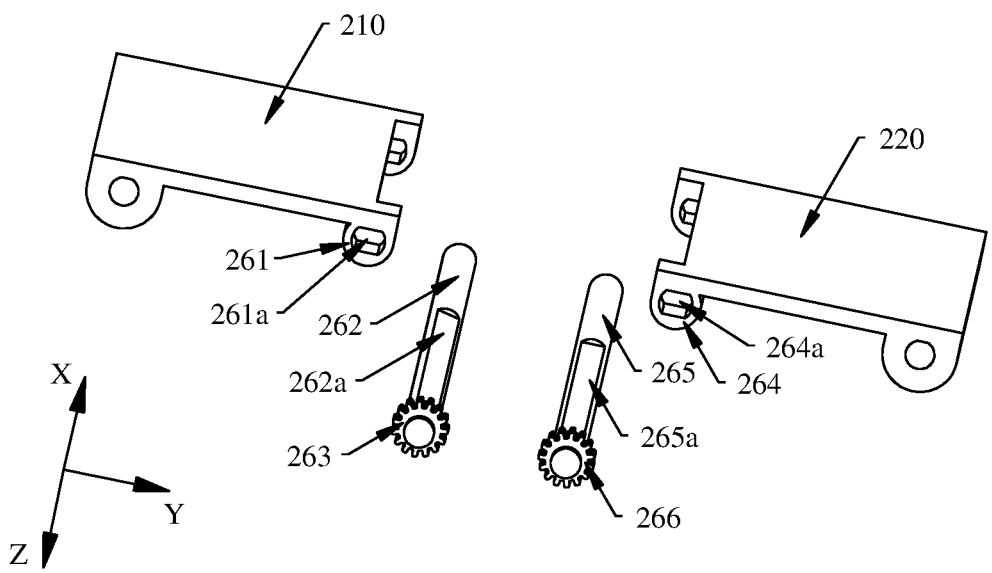
FIG. 14 is an exploded view of another transmission assembly according to this application.
Figure 15:
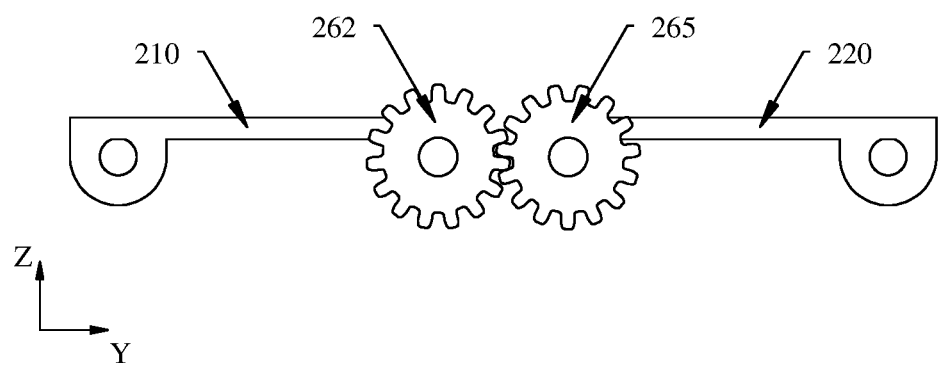
FIG. 15 is a main view of an assembly structure of the transmission assembly shown in FIG. 14.

In some embodiments, refer to FIG. 14. FIG. 14 is an exploded view of another implementation of the transmission assembly. The first gear 263 and the second gear 266 may be indirectly engaged by using the intermediate gears 167, or the first gear 263 and the second gear 266 may be directly engaged. In this way, refer to FIG. 15. FIG. 15 is a main view of assembly of the transmission assembly in FIG. 14. The first gear 263 and the second gear 266 are directly engaged, so that components can be reduced, and costs can be reduced.

Figure 16:
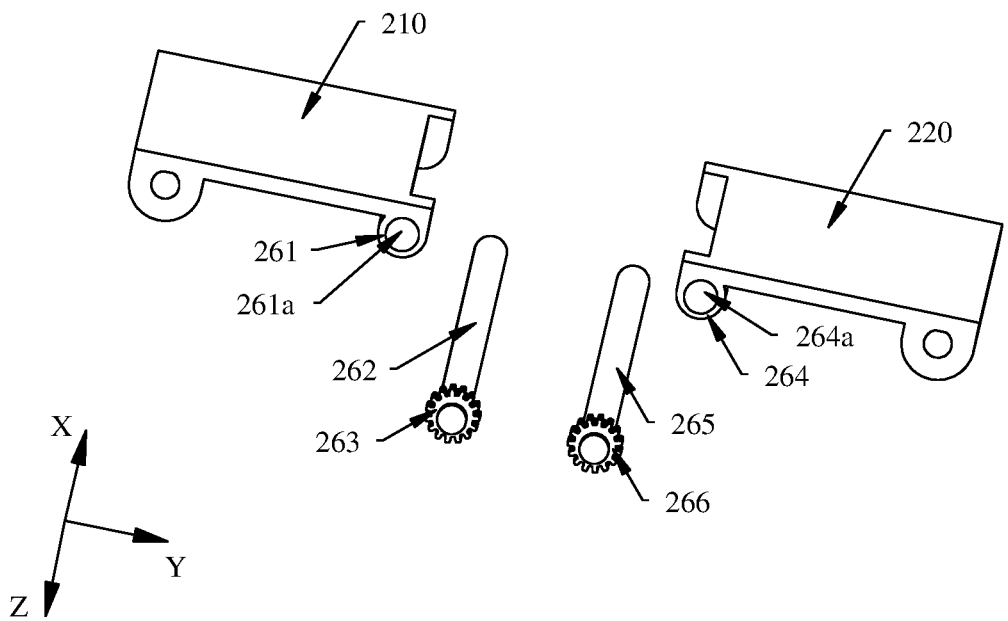
FIG. 16 is an exploded view of still another transmission assembly according to this application.

In some embodiments, refer to FIG. 16. FIG. 16 is an exploded view of still another implementation of the transmission assembly. Both the first pin shaft 262 and the second pin shaft 265 use cylindrical structures, and both the first through hole 261a provided on the first connection part 261 and the second through hole 264a provided on the second connection part 264 are circular holes. The first pin shaft 262 and the first connection part 261, and the second pin shaft 265 and the second connection part 264 may be fastened in a direction, for example, welding or gluing, to avoid relative rotation between the first pin shaft 262 and the first connection part 261, and between the second pin shaft 265 and the second connection part 264. In this way, steps of machining the shafts and the holes can be reduced, thereby reducing the machining difficulty.

Figure 17:
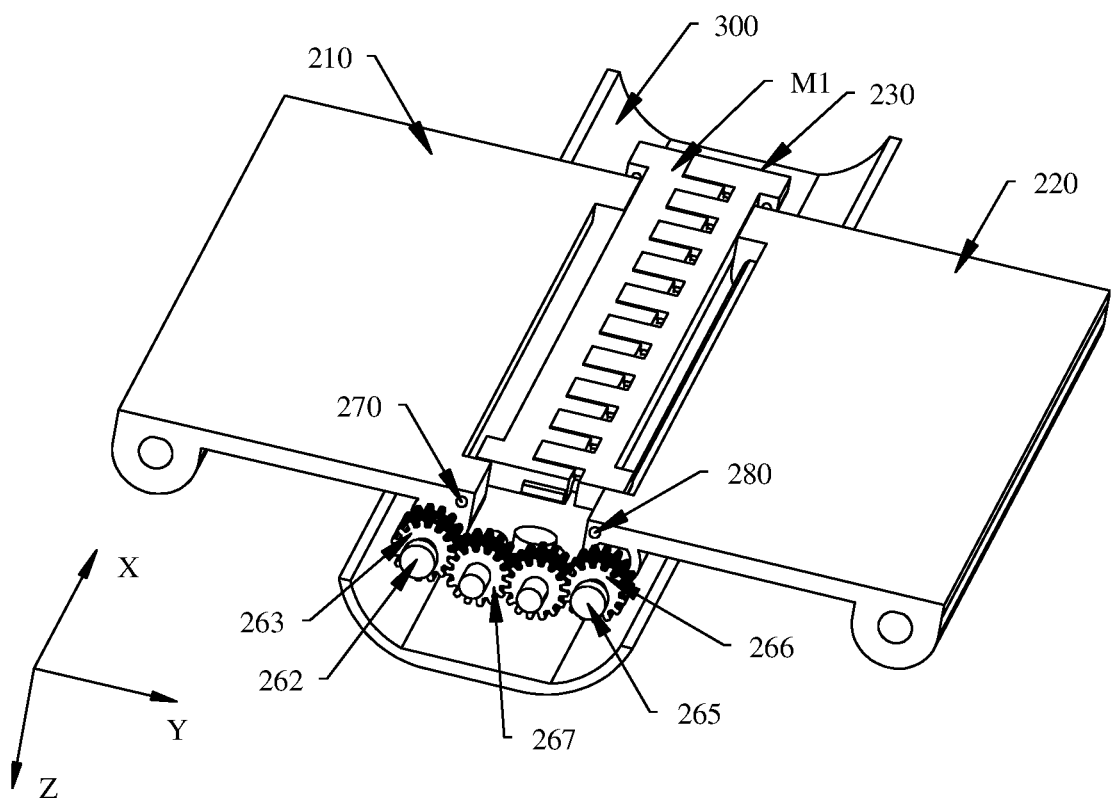
FIG. 17 is a diagram of an assembly structure of a rotating mechanism according to this application.

Based on this, refer to FIG. 17. FIG. 17 is a perspective view of the rotating mechanism 21 shown in FIG. 7 in an unfolded state. When the first swing arm 210 and the second swing arm 220 rotate around the first rotating shaft 262 and the second rotating shaft 265, respectively, the first pin shaft 270 can be driven by the first swing arm 210 to rotate in a circumferential direction of the first rotating shaft 262, and the second pin shaft 280 is driven by the second swing arm 220 to rotate in a circumferential direction of the second rotating shaft 265. When the first pin shaft 270 and the second pin shaft 280 rotate in the circumferential direction of the first rotating shaft 262 and the circumferential direction of the second rotating shaft 265, respectively, the first pin shaft 270 and the second pin shaft 280 move in a Z direction, that is, in a direction close to or away from the shaft cover 300, so that the connection plate 230 can be driven to move in the Z direction.

In addition, because the first gear 263 and the second gear 266 are engaged with each other, the first rotating shaft 262 and the second rotating shaft 265 can be driven to synchronously rotate in reverse directions, so that the first swing arm 210 and the second swing arm 220 rotate at a same angle, thereby ensuring that a circumferential rotation angle of the first pin shaft 270 around the first rotating shaft 262 is the same as a circumferential rotation angle of the second pin shaft 280 around the second rotating shaft 265. In this way, it can be ensured that both ends of the connection plate 230 in a Y direction can simultaneously rise or fall to a same position, to avoid a case in which the connection plate 230 is inclined, causing the lamination surface M1 to be inclined and abutted with the third part 13 of the foldable screen 10.

Figure 18:
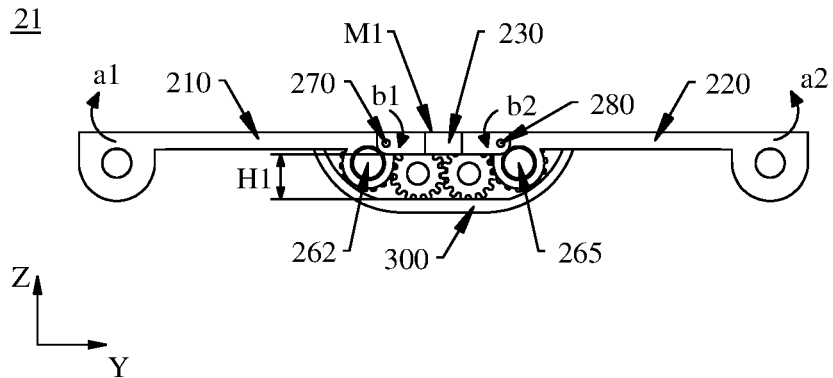
FIG. 18 is a main view of the rotating mechanism shown in FIG. 17 in an unfolded state.

Specifically, refer to FIG. 18. FIG. 18 is a main view of the rotating mechanism 21 shown in FIG. 17 in the unfolded state. When the first swing arm 210 and the second swing arm 220 are in the unfolded position, the first swing arm 210 and the second swing arm 220 are flush with the lamination surface M1 of the connection plate 230. In this case, a distance between the connection plate 230 and the shaft cover 300 is H1.

Figure 19:
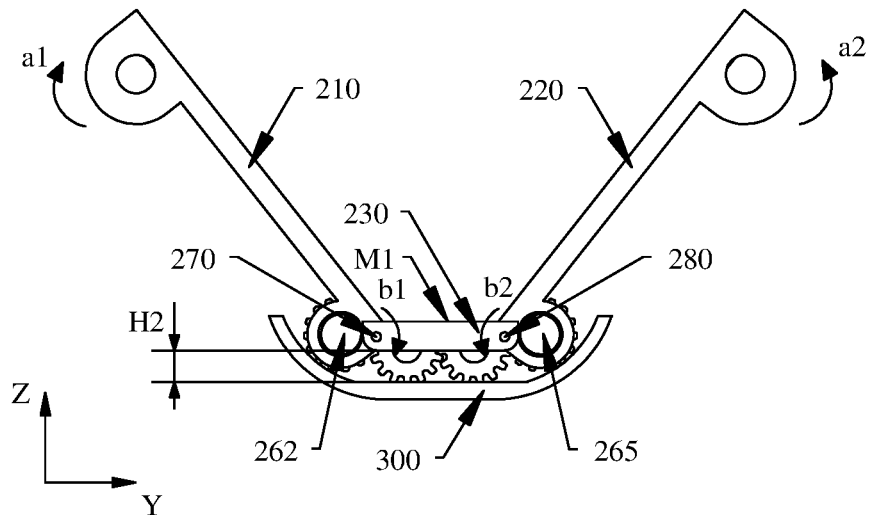
FIG. 19 is a main view of the rotating mechanism shown in FIG. 17 in a position between an unfolded state and a folded state.

When the first swing arm 210 and the second swing arm 220 rotate from the unfolded position to the folded position, the first swing arm 210 rotates in a direction a1, and the second swing arm 220 rotates in a direction a2. In addition, the first pin shaft 270 rotates in the circumferential direction of the first rotating shaft 262 and in a direction b1, and the second pin shaft 280 rotates in the circumferential direction of the second rotating shaft 265 and in a direction b2. When the first pin shaft 270 and the second pin shaft 280 rotate, the connection plate 230 can be driven to move in a direction close to the shaft cover 300. For example, refer to FIG. 19. FIG. 19 is a main view of the rotating mechanism shown in FIG. 17 in a position between the unfolded position and the folded position. In this case, the distance between the connection plate 230 and the shaft cover 300 is H2.

Figure 20:
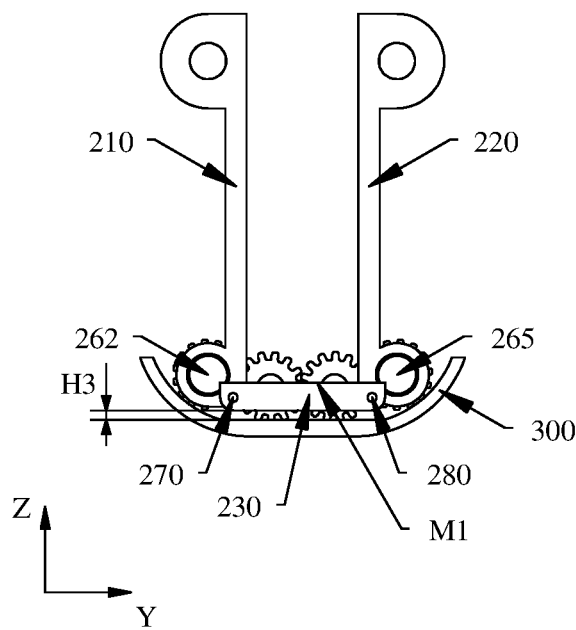
FIG. 20 is a main view of the rotating mechanism shown in FIG. 17 in a folded state.

FIG. 20 is a main view of the rotating mechanism shown in FIG. 17 in the folded position. When the first swing arm 210 and the second swing arm 220 are in the folded position, the first swing arm 210 and the second swing arm 220 are disposed opposite to each other, and an included angle between each of the first swing arm 210 and the second swing arm 220 and the connection plate 230 is a right angle. In this case, the distance between the connection plate 230 and the shaft cover 300 is H3, where H3<H2<H1. That is, in a process in which the first swing arm 210 and the second swing arm 220 rotate from the unfolded position to the folded position, the connection plate 230 moves toward the shaft cover 300, so that the connection plate 230 shifts downward for a distance, to avoid the third part 13 of the foldable screen 10.

When the first swing arm 210 and the second swing arm 220 rotate from the folded position to the unfolded position, the first swing arm 210 rotates in a direction a3 opposite to the direction a1, and the second swing arm 220 rotates in a direction a4 opposite to the direction a2. In addition, the first pin shaft 270 rotates in the circumferential direction of the first rotating shaft 262 and in a direction b3 opposite to the direction b1. The second pin shaft 280 rotates in the circumferential direction of the second rotating shaft 265 and in a direction b4 opposite to the direction b2. When the first pin shaft 270 and the second pin shaft 280 rotate, the connection plate 230 can be driven to move in a direction away from the shaft cover 300.

In addition, in a rotation process of the first swing arm 210 and the second swing arm 220, an included angle is formed between each of the first swing arm 210 and the second swing arm 220 and the lamination surface M1 of the connection plate 230. The included angle may be an obtuse angle, for example, when the first swing arm 210 and the second swing arm 220 shown in FIG. 19 rotate to a position between the unfolded position and the folded position. The included angle may alternatively be a right angle, for example, when the first swing arm 210 and the second swing arm 220 shown in FIG. 20 rotate to the folded position.

Based on this, in a process in which the first pin shaft 270 and the second pin shaft 280 move close to or away from the shaft cover 300, because the first pin shaft 270 and the second pin shaft 280 circumferentially move in the circumferential direction of the first rotating shaft 262 and the circumferential direction of the second rotating shaft 265, respectively, a distance between the first pin shaft 270 and the second pin shaft 280 changes.

Figure 21:
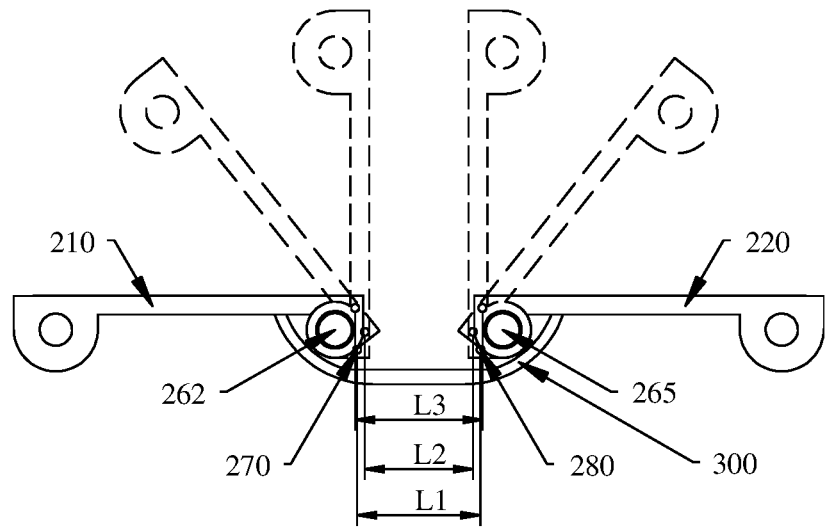
FIG. 21 is a comparison diagram of structures of a first swing arm and a second swing arm that are each in different positions according to this application.

Specifically, refer to FIG. 21. FIG. 21 is a comparison diagram in which the first swing arm 210 and the second swing arm 220 each are located in different positions. In FIG. 21, a dashed line indicates that the first swing arm 210 and the second swing arm 220 are located in the folded position. In FIG. 21, a dash-dot line indicates that the first swing arm 210 and the second swing arm 220 each are located in a position between the folded position and the unfolded position. In FIG. 21, a solid line indicates that the first swing arm 210 and the second swing arm 220 are located in the unfolded state.

When the first swing arm 210 and the second swing arm 220 are located in the folded position, the distance between the first pin shaft 270 and the second pin shaft 280 is L1. When the first swing arm 210 and the second swing arm 220 are located between the folded position and the unfolded position, the distance between the first pin shaft 270 and the second pin shaft 280 is L2. When the first swing arm 210 and the second swing arm 220 are located in the unfolded position, the distance between the first pin shaft 270 and the second pin shaft 280 is L3.

It can be seen from FIG. 21 that L3>L1>L2. That is, in a process in which the first swing arm 210 and the second swing arm 220 rotate from the folded position to the unfolded position, the distance between the first pin shaft 270 and the second pin shaft 280 first decreases and then increases, and the distance between the first pin shaft 270 and the second pin shaft 280 is constantly changed. Therefore, in this motion process, the connection plate 230 needs to be stretched and deformed in the Y direction, to move in the direction close to or away from the shaft cover 300 with the first pin shaft 270 and the second pin shaft 280.

Figure 22:
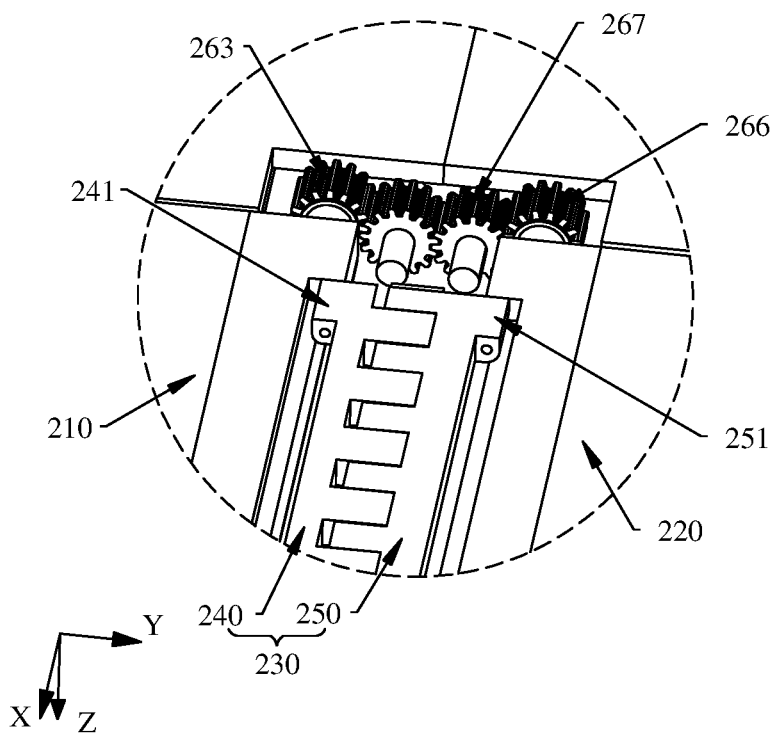
FIG. 22 is an enlarged diagram of a local structure of a connection plate of a rotating mechanism according to this application.

To enable the connection plate 230 to be stretched and deformed in the Y direction, refer to FIG. 22. FIG. 22 is an enlarged diagram of a local part of the rotating mechanism according to an embodiment of this application. The connection plate 230 provided in this example includes a first sub-plate 240 and a second sub-plate 250, where at least a part of the first sub-plate 240 is plug-connected to at least a part of the second sub-plate 250, and the first sub-plate 240 is slidably connected to the second sub-plate 250. The first connection convex lug 241 is disposed on one side that is of the first sub-plate 240 and that faces the first swing arm 210, and the second connection convex lug 251 is disposed on one side that is of the second sub-plate 250 and that faces the second swing arm 220. The first sub-plate 240 is rotatably connected to the first swing arm 210 by using the first pin shaft 270, and the second sub-plate 250 is rotatably connected to the second swing arm 220 by using the second pin shaft 280. In this way, in a process in which the first swing arm 210 and the second swing arm 220 rotate between the folded position and the unfolded position, as the distance between the first pin shaft 270 and the second pin shaft 280 changes, the first sub-plate 240 and the second sub-plate 250 are stretched and deformed through relative sliding in the Y direction, to adapt to a change in the distance between the first pin shaft 270 and the second pin shaft 280, thereby implementing elevation in the Z direction.

It should be noted that, when elastic deformation occurs on the connection plate 230, a width of the connection plate 230 in the Y direction changes based on the change in the distance between the first pin shaft 270 and the second pin shaft 280 during rotation. For example, in the process in which the first swing arm 210 and the second swing arm 220 rotate from the unfolded position to the folded position, the distance L1 between the first pin shaft 270 and the second pin shaft 280 may always increase, may first increase and then decrease, or may always decrease. The change in the distance is determined by an overall structural layout. Therefore, this is not specifically limited in this application.

Figure 23:
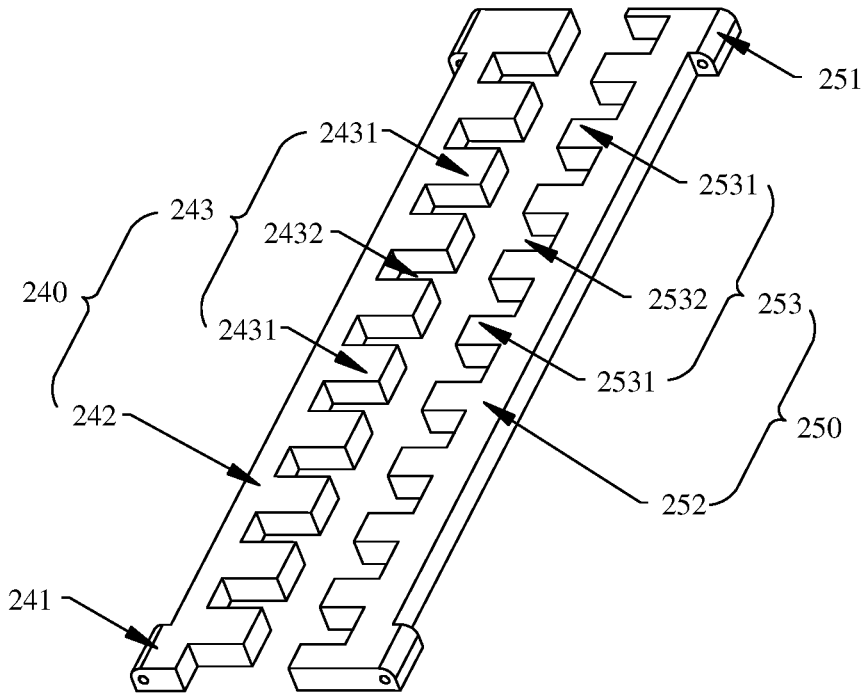
FIG. 23 is an exploded view of the connection plate shown in FIG. 22.

In some embodiments, refer to FIG. 23. FIG. 23 is an exploded view of the connection plate 230 shown in FIG. 22. The first sub-plate 240 may include a first plate body 242 and a first comb structure 243. The first comb structure 243 is located on one side that is of the first plate body 242 and that is close to the second sub-plate 250, and is connected to the first plate body 242 as an integral structure. The second sub-plate 250 may include a second plate body 252 and a second comb structure. The second comb structure is located on one side that is of the second plate body 252 and that is close to the first sub-plate 240, and is connected to the second plate body 252 as an integral structure. The first comb structure 243 and the second comb structure are plug-connected to each other. Because the first sub-plate 240 and the second sub-plate 250 are plug-connected to each other by using comb structures, when the first sub-plate 240 and the second sub-plate 250 slide in a direction away from each other, a partial overlapped area still exists between the comb structures. This narrows a gap between the first sub-plate 240 and the second sub-plate 250, thereby increasing an effective support area for the foldable screen 10.

Specifically, still refer to FIG. 23. The first comb structure 243 includes a plurality of first bumps 2431, and there is a first gap 2432 between two adjacent first bumps 2431. The second comb structure includes a plurality of second bumps 2531, and there is a second gap 2532 between two adjacent second bumps 2531. Each of the plurality of first bumps 2431 is inserted into a corresponding second gap 2532, and each of the plurality of second bumps 2531 is inserted into a corresponding first gap 2432. That is, the first comb structure 243 is the same as the second comb structure, and the first comb structure 243 and the second comb structure only need to be correspondingly plug-connected in a staggered manner. This reduces production difficulty of the connection plate 230 and improves production efficiency of the connection plate 230.

The first bump 2431 has a first sidewall 2431a, and the first sidewall 2431a faces the first gap 2432. The second bump 2531 has a second sidewall 2531a, and the second sidewall 2531a faces the second gap 2532.

Figure 24:
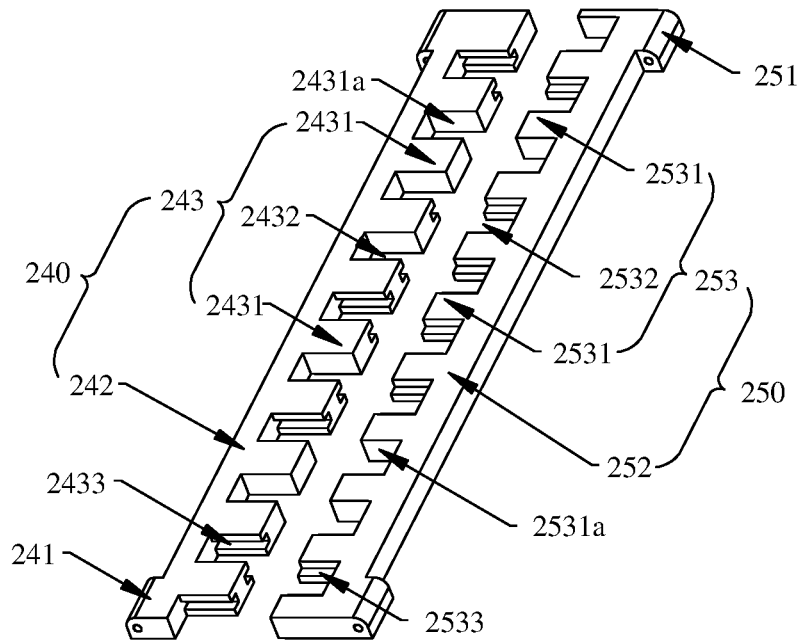
FIG. 24 is an exploded view of another implementation of the connection plate shown in FIG. 23.

In some embodiments, refer to FIG. 24. FIG. 24 is an exploded view of another embodiment of the connection plate 230 shown in FIG. 23. The first comb structure 243 further includes sliding slots 2433, where the sliding slots 2433 are disposed on some of a plurality of first sidewalls 2431a, and the sliding slot 2433 penetrates through a sidewall that is of the first bump 2431 and that faces the second plate body 252. The second comb structure further includes sliders 2533, where the sliders 2533 are disposed on at least some of a plurality of second sidewalls 2531a, the sliders 2533 are disposed corresponding to the sliding slots 2433, and each slider 2533 slidably cooperates with a corresponding sliding slot 2433. The sliding slots 2433 and the sliders 2533 are disposed on sidewalls of the first bumps 2431 and sidewalls of the second bumps 2531, and the sliding slots 2433 slidably cooperate with the sliders 2533. On the one hand, mutual support strength between the first sub-plate 240 and the second sub-plate 250 can be improved. On the other hand, a direction of relative sliding between the first sub-plate 240 and the second sub-plate 250 can be limited, to avoid an included angle between a sliding direction of each of the first sub-plate 240 and the second sub-plate 250 and the Y direction, and prevent the flatness of the lamination surface M1 from being reduced.

It should be noted that a plurality of sliding slots 2433 disposed on some of the plurality of first sidewalls 2431a may be evenly distributed. For example, the sliding slot 2433 is disposed on the first sidewall 2431a that is of each first bump 2431 and that faces a same side. The plurality of sliding slots 2433 may be unevenly distributed. For example, a plurality of first sidewalls 2431a are randomly selected, and the sliding slots 2433 are disposed on the selected first sidewalls 2431a. This is not specifically limited in this application.

In addition, the sliding slots 2433 are disposed on some of the plurality of first sidewalls 2431a, the sliders 2533 are disposed on some of the plurality of second sidewalls 2531a, and a quantity and positions of sliding slots 2433 and a quantity and positions of sliders 2533 may be set in a one-to-one correspondence, so that corresponding sliding cooperation between the sliding slots 2433 and the sliders 2533 can be implemented. Alternatively, the quantity and the positions of sliding slots 2433 and the quantity and the positions of sliders 2533 may not be set in a one-to-one correspondence. For example, the sliders 2533 may be disposed on some of a plurality of second sidewalls 2531a corresponding to a plurality of first sidewalls 2431a on which the sliding slots 2433 are disposed, so that these sliders 2533 slidably cooperate with corresponding sliding slots 2433. In other words, the quantity of sliding slots 2433 may be greater than the quantity of sliders 2533. This is not specifically limited in this application.

Figure 25:
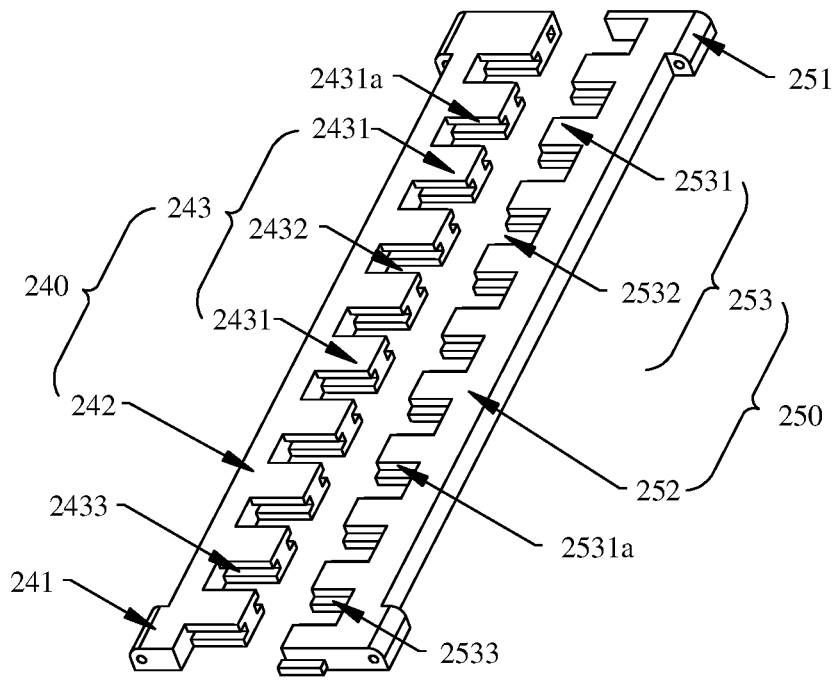
FIG. 25 is an exploded view of still another implementation of the connection plate shown in FIG. 23.
Figure 26:
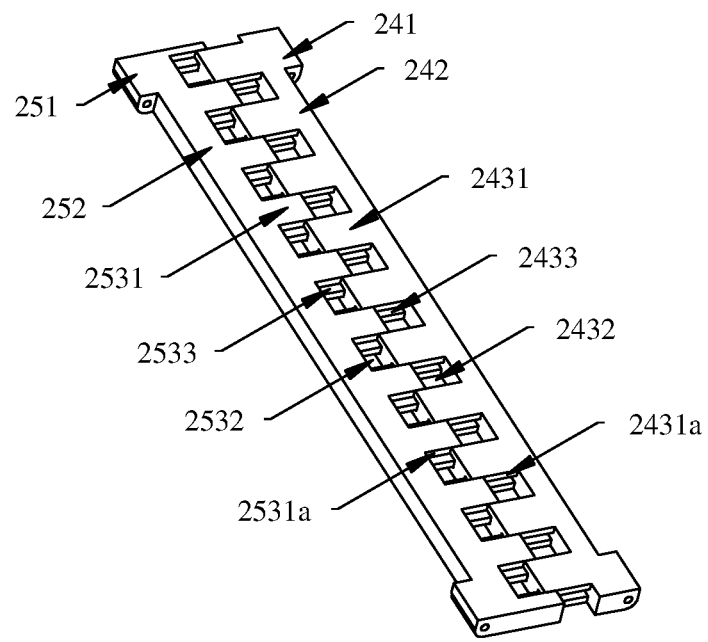
FIG. 26 is a perspective view in which a first sub-plate and a second sub-plate of the connection plate shown in FIG. 25 are plug-connected to each other.
Figure 27:
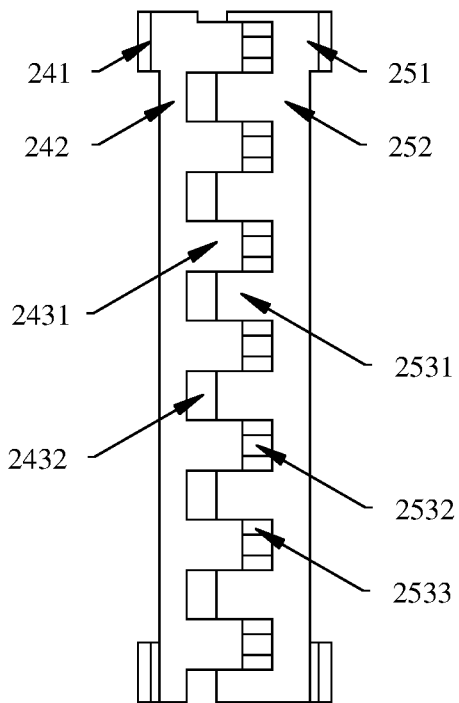
FIG. 27 is a top view in which a first sub-plate and a second sub-plate of the connection plate shown in FIG. 25 are plug-connected to each other.

To more balance stress after the first sub-plate 240 and the second sub-plate 250 are plug-connected to each other, refer to FIG. 25. FIG. 25 is an exploded view of still another embodiment of the connection plate 230 shown in FIG. 23. The sliding slot 2433 may be disposed on each of the plurality of first sidewalls 2431a, and the slider 2533 may be disposed on each of the plurality of second sidewalls 2531a. In this way, refer to FIG. 26 and FIG. 27. FIG. 26 is a perspective view in which the first sub-plate 240 and the second sub-plate 250 shown in FIG. 25 are plug-connected to each other. FIG. 27 is a top view in which the first sub-plate 240 and the second sub-plate 250 shown in FIG. 25 are plug-connected to each other. After the first bumps 2431 and the second bumps 2531 are plug-connected to each other in a staggered manner, stress on two opposite sides can be balanced, thereby further improving overall support strength.

Figure 28:
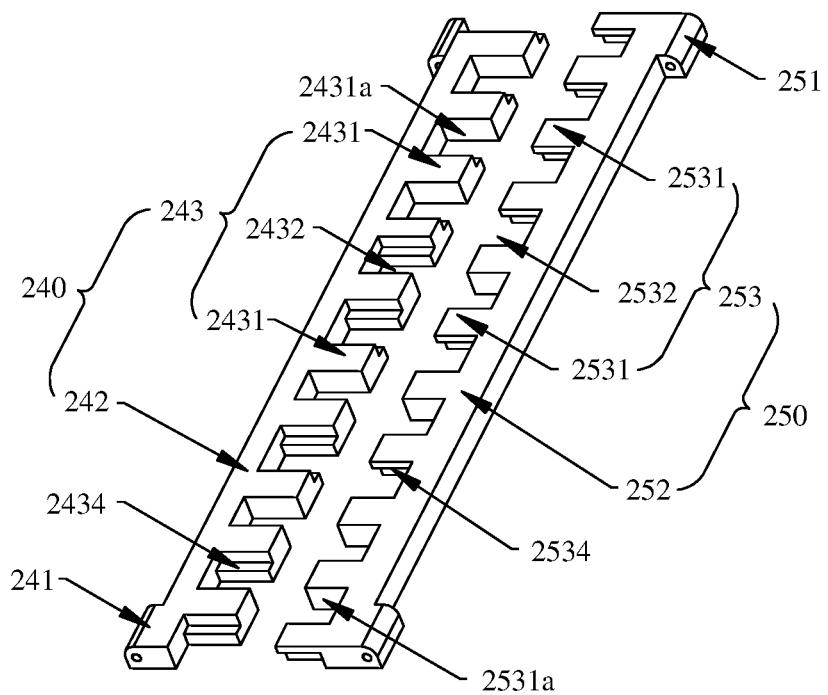
FIG. 28 is an exploded view of another connection plate shown in FIG. 22.
Figure 29:
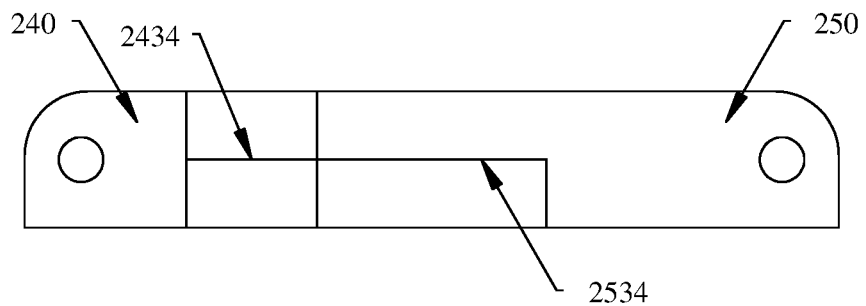
FIG. 29 is a main view of the connection plate shown in FIG. 28.

In another possible embodiment, the connection plate 230 provided in the foregoing embodiment may be replaced with the following structure. Refer to FIG. 28 and FIG. 29. FIG. 28 is an exploded view of another connection plate 230 according to this application, and FIG. 29 is a main view of the connection plate 230 shown in FIG. 28. Different from the foregoing embodiment, in this embodiment, first step surfaces 2434 are disposed on at least some of the plurality of first sidewalls 2431a, and second step surfaces 2534 are disposed on at least some of the plurality of second sidewalls 2531a. The first step surfaces 2434 and the second step surfaces 2534 are parallel to each other, and are laminated to each other.

The first sub-plate 240 and the second sub-plate 250 provided in this embodiment are laminated to each other to form a support structure by using the first step surfaces 2434 and the second step surfaces 2534. When the first sub-plate 240 and the second sub-plate 250 slide relative to each other in the Y direction, the first step surfaces 2434 and the second step surfaces 2534 slide relative to each other in the Y direction. On the one hand, mutual support is implemented, and overall support strength is improved. On the other hand, a sliding direction between the first sub-plate 240 and the second sub-plate 250 is limited by the first step surfaces 2434 and the second step surfaces 2534, so that the flatness of the lamination surface M1 is ensured.

A plurality of first step surfaces 2434 disposed on some of the plurality of first sidewalls 2431a may be evenly distributed. For example, the first step surface 2434 is disposed on the first sidewall 2431a that is of each first bump 2431 and that faces a same side. The plurality of first step surfaces 2434 may be unevenly distributed. For example, a plurality of first sidewalls 2431a are randomly selected, and the first step surfaces 2434 are disposed on the selected first sidewalls 2431a. This is not specifically limited in this application.

Figure 30:
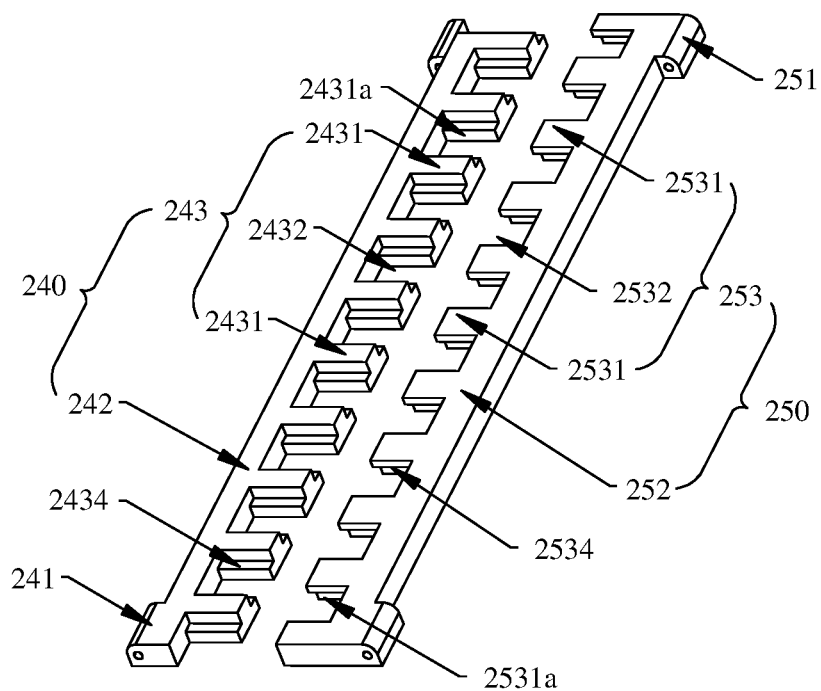
FIG. 30 is an exploded view of another implementation of the connection plate shown in FIG. 28.

To improve support strength after the first sub-plate 240 and the second sub-plate 250 are plug-connected to each other, refer to FIG. 30. FIG. 30 is an exploded view of another connection plate according to this example. The first step surface 2434 is disposed on each of the plurality of first sidewalls 2431a provided in this application, and the second step surface 2534 is disposed on each of the plurality of second sidewalls 2531a. After the first step surfaces 2434 and the second step surfaces 2534 are correspondingly laminated, support forces are formed on two opposite sides of each first bump 2431. This balances overall stress, thereby further improving the support strength.

Optionally, some of the first step surfaces 2434 may face the shaft cover 300, and some of the first step surfaces 2434 are disposed away from the shaft cover 300. Correspondingly, second step surfaces 2534 corresponding to first step surfaces 2434 disposed facing the shaft cover 300 are disposed away from the shaft cover 300, and second step surfaces 2534 corresponding to first step surfaces 2434 disposed away from the shaft cover 300 are disposed facing the shaft cover 300. Therefore, it is ensured that the first step surfaces 2434 and the second step surfaces 2534 can be laminated to each other. Still refer to FIG. 30. Alternatively, all the first step surfaces 2434 may be disposed facing the shaft cover 300, and all the second step surfaces 2534 are disposed away from the shaft cover 300. In this way, during machining, a machining position does not need to be repeatedly turned, and only one direction needs to be used to cut each first bump 2431 to form the first step surface 2434, and to cut each second bump 2531 to form the second step surface 2534, thereby reducing machining difficulty.

In addition, an included angle between the first step surface 2434 and the first sidewall 2431a may be an obtuse angle. Correspondingly, an included angle between the second step surface 2534 and the second sidewall 2531a is an acute angle. Therefore, it can be ensured that the first step surfaces 2434 and the second step surfaces 2534 are parallel to each other and are laminated to each other. Still refer to FIG. 30. Alternatively, the first step surfaces 2434 and the second step surfaces 2534 are all parallel to the lamination surface M1, that is, the first step surface 2434 is perpendicular to the first sidewall 2431a, and the second step surface 2534 is perpendicular to the second sidewall 2531a. In this way, the first step surfaces 2434 and the second step surfaces 2534 can have a same machining angle, thereby further reducing the machining difficulty.

Figure 31:
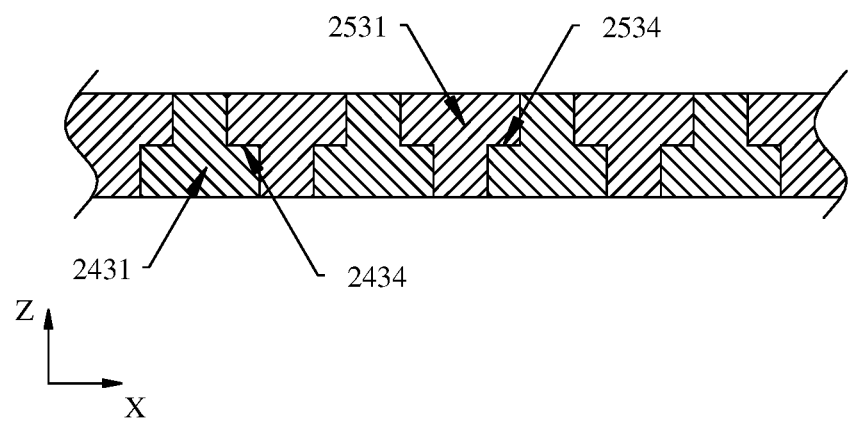
FIG. 31 is a cross-sectional view of a local structure obtained after a first sub-plate and a second sub-plate of the connection plate shown in FIG. 30 are plug-connected to each other.

Based on this, a thickness of the first step surface 2434 and a thickness of the second step surface 2534 in the Z direction may be the same or different. When the thickness of the first step surface 2434 and the thickness of the second step surface 2534 are the same, refer to FIG. 31. FIG. 31 is a schematic diagram of a structure of a local cross section of the connection plate 230 shown in FIG. 30. A structure of the first sub-plate 240 and a structure of the second sub-plate 250 are the same. During mounting, only one of the first sub-plate 240 and the second sub-plate 250 needs to be overturned, so that the two sub-plates can be plug-connected to each other. It should be noted that the thickness of each of the first step surface 2434 and the second step surface 2534 refers to a thickness of a part of a plate material that forms the first step surface 2434 or the second step surface 2534 after the first bump 2431 or the second bump 2531 is cut.

Specifically, still refer to FIG. 31. When the thickness of the first step surface 2434 is the same as the thickness of the second step surface 2534, the first step surface 2434 is formed on each of two opposite sidewalls, in the X direction, of the first bump 2431. When the second step surface 2534 is formed on each of two opposite sidewalls, in the X direction, of the second bump 2531, a cross section of each of the first bump 2431 and the second bump 2531 forms an inverted "T"-shaped structure along a cross section parallel to a ZX plane. Therefore, one of the first sub-plate 240 and the second sub-plate 250 is overturned 180° in the Y direction, so that the first sub-plate 240 and the second sub-plate 250 can be correspondingly plug-connected to each other.

Figure 32:
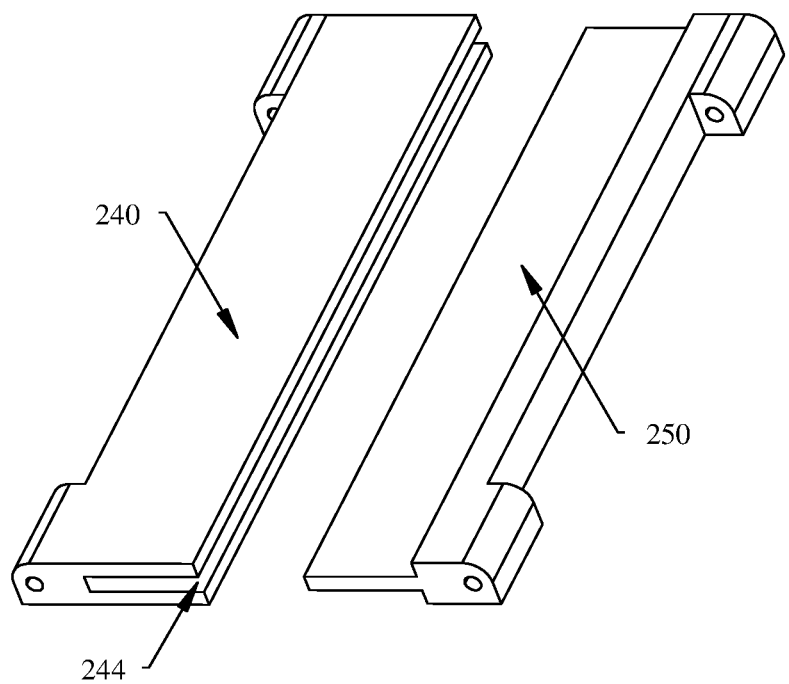
FIG. 32 is an exploded view of still another connection plate shown in FIG. 22.
Figure 33:
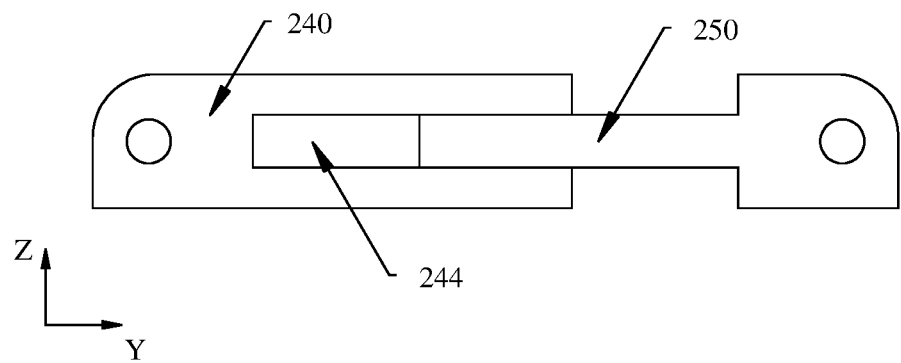
FIG. 33 is a main view obtained after a first sub-plate and a second sub-plate of the connection plate shown in FIG. 32 are plug-connected to each other.

In another possible embodiment, the connection plate 230 provided in the foregoing embodiment may be alternatively replaced with the following structure. FIG. 32 is an exploded view of still another connection plate 230 according to this application. Different from the foregoing embodiment, a sliding slot 244 is disposed on the first sub-plate 240 in this embodiment, and the sliding slot 244 is disposed on a sidewall that is of the first sub-plate 240 and that faces the second sub-plate 250, refer to FIG. 33. FIG. 33 is a main view of the connection plate 230 shown in FIG. 32. The second sub-plate 250 is inserted into the sliding slot 244.

In this example, mutual sliding cooperation between the first sub-plate 240 and the second sub-plate 250 is implemented by inserting the second sub-plate 250 into the sliding slot 244 of the first sub-plate 240. Therefore, an overall structure is simple, machining is convenient, and it reduces production costs.

Figure 34:
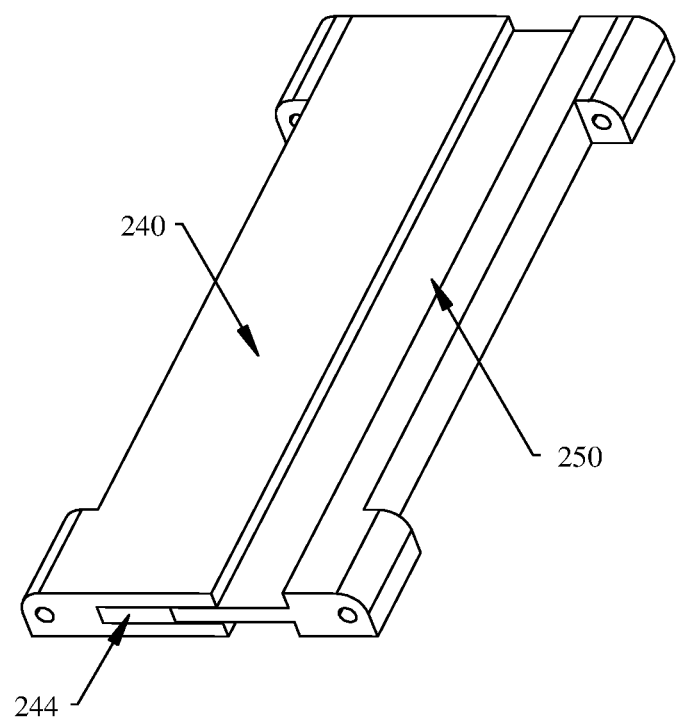
FIG. 34 is a perspective view obtained after a first sub-plate and a second sub-plate of the connection plate shown in FIG. 32 are plug-connected to each other.

To further reduce the machining difficulty, refer to FIG. 34. FIG. 34 is a perspective view of a structure of the connection plate 230 shown in FIG. 32 after plug-connection. The sliding slot 244 provided in this application penetrates through two opposite sidewalls on the first sub-plate 240 in the X direction (parallel to the lamination surface M1 and perpendicular to the first direction). During machining, the sliding slot 244 can be formed by cutting a sidewall, perpendicular to the X direction, of the first sub-plate 240. Compared with excavating the sliding slot 244 on a sidewall that is of the first sub-plate 240 and that faces the second sub-plate 250, the solution has simpler machining, which helps reduce the machining difficulty.

In conclusion, in the rotating mechanism 21 provided in embodiments of the present invention, the first swing arm 210 and the second swing arm 220 are separately rotatably connected to the shaft cover 300 by using the first rotating shaft 262 and the second rotating shaft 265, and the first swing arm 210 is in a transmission connection to the second swing arm 220 by using the transmission assembly 260, so that the first swing arm 210 and the second swing arm 220 can synchronously rotate in reverse directions. In addition, the connection plate 230 is separately rotatably connected to the first swing arm 210 and the second swing arm 220 by using the first pin shaft 270 and the second pin shaft 280. Therefore, in the process in which the first swing arm 210 and the second swing arm 220 rotate around the first rotating shaft 262 and the second rotating shaft 265, respectively, the first pin shaft 270 and the second pin shaft 280 can be driven to rotate in the circumferential direction of the first rotating shaft 262 and the circumferential direction of the second rotating shaft 265. In addition, the first pin shaft 270 and the second pin shaft 280 move in the direction close to or away from the shaft cover 300, and drive the connection plate 230 to move in the direction close to or away from the shaft cover 300.

Compared with the conventional technology, because there is no other structure between the connection plate 230 and the shaft cover 300 in this application, when the first swing arm 210 and the second swing arm 220 are in the unfolded position, the distance between the connection plate 230 and the shaft cover 300 is reduced. In addition, in the process in which the first swing arm 210 and the second swing arm 220 rotate from the unfolded position to the folded position, the connection plate 230 can be driven by the first swing arm 210 and the second swing arm 220 to move in the direction close to the shaft cover 300, to avoid the foldable screen 10. Therefore, the rotating mechanism 21 provided in this application has a smaller overall volume and fewer components, so that the connection plate 230 can complete a large-distance downward shift in a small space, thereby further implementing overall lightening and thinning of the terminal 01 with a foldable screen.

In addition, two sides, in the first direction, of the connection plate 230 are respectively rotatably connected to the first swing arm 210 and the second swing arm 220, that is, the avoidance gap 207 does not need to be reserved between the connection plate 230 and the first swing arm 210 and between the connection plate 230 and the second swing arm 220. Therefore, the foldable screen 10 can be effectively supported, no recess is generated, and user experience is good.

In description of this specification, specific features, structures, materials, or characteristics described may be combined in any one or more embodiments or examples in a suitable manner.

The foregoing descriptions are merely specific implementations of this application, but are not intended to limit the protection scope of this application. Any change or replacement readily figured out by a person skilled in the art within the technical scope disclosed in this application shall fall within the protection scope of this application. Therefore, the protection scope of this application shall be subject to the protection scope of the claims.

What is claimed is:

1. A rotating mechanism, comprising:
   a shaft cover; and
   at least one folding assembly, wherein the folding assembly comprises:
   a connection plate, wherein a surface of the connection plate away from the shaft cover is a lamination surface, the lamination surface is used for lamination to a part of a foldable screen, the connection plate can be stretched and deformed in a first direction, the first direction is parallel to the lamination surface, and the connection plate has, in the first direction, a first side and a second side that opposite to each other;
   a first swing arm, disposed on the first side of the connection plate, and separately rotatably connected to the connection plate and the shaft cover;
   a second swing arm, disposed on the second side of the connection plate, and separately rotatably connected to the connection plate and the shaft cover; and
   a transmission assembly, in a transmission connection to the first swing arm and the second swing arm, and configured to drive the first swing arm and the second swing arm to rotate in reverse directions, so that the first swing arm and the second swing arm rotate between a folded position and an unfolded position; and
   in a process in which the first swing arm and the second swing arm rotate from the folded position to the unfolded position, the connection plate is stretched and deformed, and moves in a direction away from the shaft cover; and in a process in which the first swing arm and the second swing arm rotate from the unfolded position to the folded position, the connection plate is stretched and deformed, and moves in a direction close to the shaft cover,
   wherein the connection plate comprises a first sub-plate and a second sub-plate, at least a part of the first sub-plate is plug-connected to at least a part of the second sub-plate, and the first sub-plate is slidably connected to the second sub-plate; and
   one end that is of the first sub-plate and that is away from the second sub-plate is rotatably connected to the first swing arm, and one end that is of the second sub-plate and that is away from the first sub-plate is rotatably connected to the second swing arm,
   wherein the first sub-plate comprises a first plate body and a first comb structure, and the first comb structure is located on one side that is of the first plate body and that is close to the second sub-plate, and is connected to the first plate body:
   the second sub-plate comprises a second plate body and a second comb structure, and the second comb structure is located on one side that is of the second plate body and that is close to the first sub-plate, and is connected to the second plate body; and
   the first comb structure and the second comb structure are plug-connected to each other, and
   wherein the first comb structure comprises a plurality of first bumps, and there is a first gap between two adjacent first bumps;
   the second comb structure comprises a plurality of second bumps, and there is a second gap between two adjacent second bumps; and
   each of the plurality of first bumps is inserted into a corresponding second gap, and each of the plurality of second bumps is inserted into a corresponding first gap.

2. The rotating mechanism according to claim 1, wherein each of the plurality of the first bumps has a first sidewall, the first sidewall faces the first gap, each of the plurality of the second bumps has a second sidewall, and the second sidewall faces the second gap;
   the first comb structure further comprises sliding slots, the sliding slots are disposed on at least some of a plurality of first sidewalls, and the sliding slot penetrates through a sidewall that is of each first bump and that faces the second plate body; and the second comb structure further comprises sliders, the sliders are disposed on at least some of a plurality of second sidewalls, the sliders are disposed corresponding to the sliding slots, and each slider slidably cooperates with a corresponding sliding slot.

3. The rotating mechanism according to claim 2, wherein the sliding slot is disposed on each first sidewall, and the slider is disposed on each second sidewall.

4. The rotating mechanism according to claim 1, wherein each of the plurality of the first bumps has a first sidewall, the first sidewall faces the first gap, each of the plurality of the second bumps has a second sidewall, and the second sidewall faces the second gap;
- the first comb structure further comprises first step surfaces, and the first step surfaces are disposed on at least some of a plurality of first sidewalls;
- the second comb structure further comprises second step surfaces, and the second step surfaces are disposed on at least some of a plurality of second sidewalls; and
- the first step surfaces and the second step surfaces are parallel to and laminated to each other.

5. The rotating mechanism according to claim 4, wherein the first step surface is disposed on each first sidewall, and the second step surface is disposed on each second sidewall.

6. The rotating mechanism according to claim 4, wherein all the first step surfaces face the shaft cover, all the second step surfaces are away from the shaft cover, and the first step surfaces and the second step surfaces are all parallel to the lamination surface.

7. A support apparatus, comprising a first housing, a second housing, and the rotating mechanism according to claim 1, wherein the rotating mechanism is located between the first housing and the second housing, the first swing arm of the rotating mechanism is connected to the first housing, and the second swing arm of the rotating mechanism is connected to the second housing.

8. A terminal with a foldable screen, comprising:
a foldable screen, comprising a first part, a second part, and a third part, wherein the third part is located between the first part and the second part; and
a support apparatus, which is the support apparatus according to claim 7, wherein the first part is fastened onto the first housing, the second part is fastened onto the second housing, and the third part is supported on the lamination surface of the rotating mechanism.

9. A rotating mechanism, comprising:
a shaft cover; and
at least one folding assembly, wherein the folding assembly comprises:
a connection plate, wherein a surface of the connection plate away from the shaft cover is a lamination surface, the lamination surface is used for lamination to a part of a foldable screen, the connection plate can be stretched and deformed in a first direction, the first direction is parallel to the lamination surface, and the connection plate has, in the first direction, a first side and a second side that opposite to each other;
a first swing arm, disposed on the first side of the connection plate, and separately rotatably connected to the connection plate and the shaft cover:
a second swing arm, disposed on the second side of the connection plate, and separately rotatably connected to the connection plate and the shaft cover; and
a transmission assembly, in a transmission connection to the first swing arm and the second swing arm, and configured to drive the first swing arm and the second swing arm to rotate in reverse directions, so that the first swing arm and the second swing arm rotate between a folded position and an unfolded position; and
in a process in which the first swing arm and the second swing arm rotate from the folded position to the unfolded position, the connection plate is stretched and deformed, and moves in a direction away from the shaft cover; and in a process in which the first swing arm and the second swing arm rotate from the unfolded position to the folded position, the connection plate is stretched and deformed, and moves in a direction close to the shaft cover,
wherein the connection plate comprises a first sub-plate and a second sub-plate, at least a part of the first sub-plate is plug-connected to at least a part of the second sub-plate, and the first sub-plate is slidably connected to the second sub-plate, and
one end that is of the first sub-plate and that is away from the second sub-plate is rotatably connected to the first swing arm, and one end that is of the second sub-plate and that is away from the first sub-plate is rotatably connected to the second swing arm, and
wherein a sliding slot is disposed on the first sub-plate, the sliding slot is disposed on a sidewall that is of the first sub-plate and that faces the second sub-plate, the sliding slot penetrates through two opposite sidewalls on the first sub-plate in a direction parallel to the lamination surface and perpendicular to the first direction, and the second sub-plate is inserted into the sliding slot.

10. A rotating mechanism, comprising:
a shaft cover; and
at least one folding assembly, wherein the folding assembly comprises:
a connection plate, wherein a surface of the connection plate away from the shaft cover is a lamination surface, the lamination surface is used for lamination to a part of a foldable screen, the connection plate can be stretched and deformed in a first direction, the first direction is parallel to the lamination surface, and the connection plate has, in the first direction, a first side and a second side that opposite to each other;
a first swing arm, disposed on the first side of the connection plate, and separately rotatably connected to the connection plate and the shaft cover;
a second swing arm, disposed on the second side of the connection plate, and separately rotatably connected to the connection plate and the shaft cover; and
a transmission assembly, in a transmission connection to the first swing arm and the second swing arm, and configured to drive the first swing arm and the second swing arm to rotate in reverse directions, so that the first swing arm and the second swing arm rotate between a folded position and an unfolded position; and
in a process in which the first swing arm and the second swing arm rotate from the folded position to the unfolded position, the connection plate is stretched and deformed, and moves in a direction away from the shaft cover; and in a process in which the first swing arm and the second swing arm rotate from the unfolded position to the folded position, the connection plate is stretched and deformed, and moves in a direction close to the shaft cover,
wherein the connection plate comprises a first sub-plate and a second sub-plate, at least a part of the first sub-plate is plug-connected to at least a part of the second sub-plate, and the first sub-plate is slidably connected to the second sub-plate; and
one end that is of the first sub-plate and that is away from the second sub-plate is rotatably connected to the first swing arm, and one end that is of the second sub-plate and that is away from the first sub-plate is rotatably connected to the second swing arm, and
wherein a first mounting hole is provided on the first swing arm, a second mounting hole is provided on the second swing arm, and the folding assembly further comprises:
a first connection convex lug, disposed on a surface that is of the first sub-plate and that faces the first swing arm, and connected to the first sub-plate, wherein a first connection hole is provided on the first connection convex lug;
a first pin shaft, inserted into the first connection hole and the first mounting hole, wherein the first pin shaft is parallel to the lamination surface and perpendicular to the first direction;
a second connection convex lug, disposed on a surface that is of the second sub-plate and that faces the second swing arm, and connected to the second sub-plate, wherein a second connection hole is provided on the second connection convex lug; and
a second pin shaft, inserted into the second connection hole and the second mounting hole, wherein the second pin shaft is parallel to the lamination surface and perpendicular to the first direction.

11. The rotating mechanism according to claim 10, wherein the transmission assembly comprises:

a first connection part, disposed on one side that is of the first swing arm and that is close to the shaft cover, and connected to the first swing arm;
a first rotating shaft, passing through the first connection part and fixedly connected to the first connection part, wherein the first rotating shaft is rotatably connected to the shaft cover, and the first rotating shaft is parallel to the lamination surface and perpendicular to the first direction;
a first gear, fastened onto the first rotating shaft, and coaxially disposed with the first rotating shaft;
a second connection part, disposed on one side that is of the second swing arm and that is close to the shaft cover, and connected to the second swing arm;
a second rotating shaft, passing through the second connection part and fixedly connected to the second connection part, wherein the second rotating shaft is rotatably connected to the shaft cover and is parallel to the first rotating shaft; and
a second gear, fastened onto the second rotating shaft, and coaxially disposed with the second rotating shaft, wherein the second gear is engaged with the first gear.

12. The rotating mechanism according to claim 11, wherein the transmission assembly further comprises:

N intermediate gears, wherein the N intermediate gears are sequentially engaged, and are disposed between the first gear and the second gear; the N sequentially engaged intermediate gears are engaged with the first gear and the second gear; and N is greater than 0, and N is an even number.

* * * * *

UNITED STATES PATENT AND TRADEMARK OFFICE
CERTIFICATE OF CORRECTION

PATENT NO. : 12,168,994 B2  
APPLICATION NO. : 17/916607  
DATED : December 17, 2024  
INVENTOR(S) : Lei Feng Page 1 of 1

It is certified that error appears in the above-identified patent and that said Letters Patent is hereby corrected as shown below:

On the Title Page

"(71) Applicant: HONOR DEVICE CO., LTD., Guangdong (CN)" should be "(71) Applicant: HONOR DEVICE CO., LTD., Shenzhen (CN)";

In the Claims

Column 22, Claim 2, Line 2, change "wherein each of the plurality of the first bumps" to -- wherein the first bump --;

Column 22, Claim 2, Line 3, change "each of the plurality of the second bumps" to -- the second bump --;

Column 22, Claim 2, Line 9, change "a sidewall that is of each" to -- a sidewall that is of --;

Column 23, Claim 4, Lines 1 and 2, change "wherein each of the plurality of the first bumps" to -- wherein the first bump --; and Column 23, Claim 4, Lines 3 and 4, change "each of the plurality of the second bumps" to -- the second bump --.

Signed and Sealed this  
Twenty-eighth Day of January, 2025

Coke Morgan Stewart  
*Acting Director of the United States Patent and Trademark Office*